United States Patent
Grayson et al.

(10) Patent No.: US 8,595,292 B2
(45) Date of Patent: *Nov. 26, 2013

(54) ELECTRONIC CONTENT MANAGEMENT SYSTEMS AND METHODS

(75) Inventors: Timothy Ray Demkiw Grayson, Ottawa (CA); Warren Lloyd Tomlin, Carleton Place (CA)

(73) Assignee: Canada Post Corporation, Ottawa, Ontario (CA)

( * ) Notice: Subject to any disclaimer, the term of this patent is extended or adjusted under 35 U.S.C. 154(b) by 56 days.

This patent is subject to a terminal disclaimer.

(21) Appl. No.: 13/251,585

(22) Filed: Oct. 3, 2011

(65) Prior Publication Data
US 2012/0023196 A1  Jan. 26, 2012

Related U.S. Application Data

(63) Continuation of application No. 11/505,314, filed on Aug. 17, 2006, now Pat. No. 8,060,555.

(60) Provisional application No. 60/708,756, filed on Aug. 17, 2005.

(51) Int. Cl.
*G06F 15/173* (2006.01)
(52) U.S. Cl.
USPC .......................................... 709/203; 709/219
(58) Field of Classification Search
USPC .......... 709/203, 217, 224, 219; 715/700–866; 705/26.1–26.9, 27.1–27.2
See application file for complete search history.

(56) References Cited

U.S. PATENT DOCUMENTS

| | | | |
|---|---|---|---|
| 4,792,946 A | 12/1988 | Mayo | |
| 5,805,810 A | 9/1998 | Maxwell | |
| 5,978,780 A | 11/1999 | Watson | |
| 6,052,591 A | 4/2000 | Bhatia | |
| 6,128,603 A | 10/2000 | Dent et al. | |
| 6,298,335 B1 | 10/2001 | Bernstein | |
| 6,438,584 B1 | 8/2002 | Powers | |

(Continued)

FOREIGN PATENT DOCUMENTS

| | | |
|---|---|---|
| CA | 2207657 | 1/1998 |
| CA | 2275211 | 6/1998 |

(Continued)

OTHER PUBLICATIONS

U.S. Office Action issued on Mar. 16, 2009 in respect of U.S. Appl. No. 11/505,314 (17 pages including Notice of References Cited).

(Continued)

*Primary Examiner* — Ruolei Zong

(57) ABSTRACT

Electronic content management systems and methods are disclosed. Geographic locator addresses such as mailing addresses are associated with respective, unique, geo-specific electronic addresses. For example, unique electronic addresses may be generated based on information specifying geographic locator addresses. The electronic address associated with a geographic locator address, to which information is to be distributed, may then be determined, and electronic content which includes the information to be distributed can be made available through the electronic address. The geo-specific nature of the electronic addresses may also be used to make electronic content that has local significance available through an electronic address. A user system may determine a type of the electronic content obtained through an electronic address and process the electronic content according to the determined type.

41 Claims, 15 Drawing Sheets

(56) References Cited

U.S. PATENT DOCUMENTS

| | | |
|---|---|---|
| 6,604,132 B1 | 8/2003 | Hitt |
| 6,611,751 B2 * | 8/2003 | Warren .................. 701/200 |
| 6,668,353 B1 | 12/2003 | Yurkovic |
| 6,691,158 B1 | 2/2004 | Douvikas et al. |
| 6,708,205 B2 | 3/2004 | Sheldon et al. |
| 6,732,178 B1 | 5/2004 | Van Horne et al. |
| 6,816,878 B1 | 11/2004 | Zimmers et al. |
| 6,839,687 B1 | 1/2005 | Dent et al. |
| 7,092,997 B1 * | 8/2006 | Kasriel et al. ............ 709/213 |
| 7,155,484 B2 * | 12/2006 | Malik .................. 709/206 |
| 7,328,233 B2 | 2/2008 | Salim et al. |
| 7,433,876 B2 | 10/2008 | Spivack et al. |
| 7,440,953 B2 | 10/2008 | Sidman |
| 7,478,140 B2 | 1/2009 | King et al. |
| 7,526,448 B2 | 4/2009 | Zielke et al. |
| 7,584,263 B1 | 9/2009 | Hicks, III et al. |
| 7,624,125 B2 | 11/2009 | Feinsmith |
| 7,660,581 B2 | 2/2010 | Ramer et al. |
| 7,689,682 B1 | 3/2010 | Eldering et al. |
| 7,711,950 B2 | 5/2010 | Orbke et al. |
| 7,797,543 B1 * | 9/2010 | Campbell et al. ........... 713/178 |
| 7,801,956 B1 | 9/2010 | Cumberbatch et al. |
| 7,917,468 B2 | 3/2011 | Ariel et al. |
| 2001/0013050 A1 | 8/2001 | Shah |
| 2001/0020235 A1 | 9/2001 | Game |
| 2001/0032182 A1 | 10/2001 | Kumar et al. |
| 2001/0037369 A1 | 11/2001 | Joo |
| 2002/0002536 A1 | 1/2002 | Braco |
| 2002/0002590 A1 | 1/2002 | King et al. |
| 2002/0029248 A1 | 3/2002 | Cook et al. |
| 2002/0029249 A1 | 3/2002 | Campbell et al. |
| 2002/0035493 A1 | 3/2002 | Mozayeny et al. |
| 2002/0049907 A1 | 4/2002 | Woods et al. |
| 2002/0059381 A1 * | 5/2002 | Cook et al. .............. 709/206 |
| 2002/0059430 A1 | 5/2002 | Orbke et al. |
| 2002/0069168 A1 | 6/2002 | Lee et al. |
| 2002/0087389 A1 | 7/2002 | Sklarz et al. |
| 2002/0107981 A1 | 8/2002 | Moore et al. |
| 2002/0138619 A1 * | 9/2002 | Ramaley et al. ........... 709/226 |
| 2002/0152273 A1 | 10/2002 | Pradhan et al. |
| 2002/0161633 A1 * | 10/2002 | Jacob et al. ............... 705/14 |
| 2002/0184117 A1 * | 12/2002 | Provost .................. 705/27 |
| 2003/0061114 A1 | 3/2003 | Schwartz et al. |
| 2003/0064705 A1 | 4/2003 | Desiderio |
| 2003/0074411 A1 | 4/2003 | Nale |
| 2003/0101063 A1 | 5/2003 | Sexton et al. |
| 2003/0217111 A1 | 11/2003 | McKay |
| 2004/0030631 A1 | 2/2004 | Brown et al. |
| 2004/0044734 A1 | 3/2004 | Beck |
| 2004/0054730 A1 | 3/2004 | Carter et al. |
| 2004/0054731 A1 | 3/2004 | Carter et al. |
| 2004/0054732 A1 | 3/2004 | Carter et al. |
| 2004/0083114 A1 | 4/2004 | Yue |
| 2004/0098338 A1 | 5/2004 | Uehara et al. |
| 2004/0139049 A1 | 7/2004 | Hancock et al. |
| 2004/0215572 A1 | 10/2004 | Uehara et al. |
| 2005/0013417 A1 | 1/2005 | Zimmers et al. |
| 2005/0027590 A9 | 2/2005 | Gailey et al. |
| 2005/0091300 A1 * | 4/2005 | Starbuck et al. ........... 709/200 |
| 2005/0108136 A1 | 5/2005 | Schneider |
| 2005/0163136 A1 | 7/2005 | Chiu et al. |
| 2005/0177491 A1 | 8/2005 | Siverson et al. |
| 2005/0180329 A1 | 8/2005 | Qiu et al. |
| 2005/0192999 A1 | 9/2005 | Cook et al. |
| 2006/0010373 A1 | 1/2006 | Burns |
| 2006/0080730 A1 | 4/2006 | Cahill et al. |
| 2006/0161654 A1 | 7/2006 | Hollingsworth et al. |
| 2006/0218630 A1 | 9/2006 | Pearson et al. |
| 2007/0083438 A1 * | 4/2007 | Coleman ................... 705/26 |
| 2007/0112636 A1 | 5/2007 | Lucker, Jr. |
| 2007/0218900 A1 | 9/2007 | Abhyanker |
| 2008/0133708 A1 | 6/2008 | Alvarado et al. |
| 2008/0147790 A1 | 6/2008 | Malaney et al. |
| 2008/0162637 A1 | 7/2008 | Adamczyk et al. |
| 2008/0177768 A1 | 7/2008 | Salim et al. |
| 2008/0222127 A1 | 9/2008 | Bergin |
| 2008/0263152 A1 | 10/2008 | Daniels et al. |
| 2008/0306959 A1 | 12/2008 | Spivack et al. |
| 2009/0024473 A1 | 1/2009 | Friedman |
| 2009/0024474 A1 | 1/2009 | Friedman |
| 2009/0150488 A1 | 6/2009 | Martin-Cocher et al. |
| 2009/0152349 A1 | 6/2009 | Bonev et al. |
| 2009/0186628 A1 | 7/2009 | Yonker et al. |
| 2009/0210399 A1 | 8/2009 | Simpson et al. |
| 2010/0036777 A1 | 2/2010 | Korosec |
| 2010/0082652 A1 | 4/2010 | Jones et al. |
| 2010/0145718 A1 | 6/2010 | Elmore et al. |
| 2010/0145871 A1 | 6/2010 | Kesem et al. |
| 2010/0241493 A1 | 9/2010 | Onischuk |
| 2010/0281352 A1 | 11/2010 | Mohr |
| 2011/0029398 A1 | 2/2011 | Boudville |
| 2011/0053559 A1 | 3/2011 | Klein |
| 2011/0072095 A1 | 3/2011 | Havriluk |
| 2011/0087571 A1 | 4/2011 | Sagi et al. |
| 2011/0087746 A1 | 4/2011 | Sagi et al. |

FOREIGN PATENT DOCUMENTS

| | | |
|---|---|---|
| CA | 2319750 | 8/1999 |
| CA | 2324098 | 9/1999 |
| CA | 2321751 | 5/2000 |
| CA | 2371566 | 11/2000 |
| CA | 2410599 | 12/2001 |
| CA | 2365705 | 9/2002 |
| CA | 2495560 | 2/2004 |
| CA | 2499460 | 4/2004 |
| CA | 2514836 | 9/2004 |
| CA | 2614227 | 3/2007 |
| CA | 2620770 | 3/2007 |
| CA | 2635523 | 7/2007 |
| CA | 2693534 | 1/2009 |
| CA | 2709623 | 6/2009 |
| CA | 2253967 | 6/2011 |
| WO | 0067105 | 11/2000 |
| WO | 01/67270 | 9/2001 |
| WO | 01/71540 | 9/2001 |
| WO | 0203243 | 1/2002 |
| WO | 02/065320 | 8/2002 |
| WO | 03034280 | 4/2003 |
| WO | 2005122036 | 12/2005 |
| WO | 2008076905 | 6/2008 |
| WO | 2008/150740 | 12/2008 |
| WO | 2009/017942 | 2/2009 |
| WO | 2010027147 | 3/2010 |
| WO | 2010037792 | 4/2010 |
| WO | 2011028785 | 3/2011 |
| WO | 2011035549 | 3/2011 |

OTHER PUBLICATIONS

U.S. Office Action issued on Nov. 16, 2009 in respect of U.S. Appl. No. 11/505,314 (24 pages including Notice of References Cited).
U.S. Office Action issued on Jun. 29, 2010 in respect of U.S. Appl. No. 11/505,314 (27 pages including Notice of References Cited).
U.S. Final Office Action issued on Dec. 9, 2010 in respect of U.S. Appl. No. 11/505,314 (28 pages).
Notice of Allowance and Notice of Allowability issued on Jun. 27, 2011 in respect of U.S. Appl. No. 11/505,314 (11 pages).

* cited by examiner

| | ▶Homepage | ▶Mailbox | ▶Community | ▶Marketplace | ▶Options | | | Francais Signout |
|---|---|---|---|---|---|---|---|---|
| | | | | | FindMe | Home | ▼ P ? | Live Agent Help ? |

Mailbox for
www.domain.ca/K1A0B1/2701Riverside

| myMail | | | | | | | | myTime | P ? – |
|---|---|---|---|---|---|---|---|---|---|
| EPM | ⌐ | ! | ∅ | To | From | Subject | Received | ▼ February 2005 | |
| $ | ◯ | ⌐ | | User | Telephone | Telephone Statement LOCKED | 1/3/2005 | 1 2 3 4 5 | |
| $ | ◯ | ⌐ | | User | TV/Internet | Online Billing Payment LOCKED | 1/3/2005 | 6 7 8 9 10 11 12 | |
| | ◯ | | ∅ | User | Car Company | New Model | 1/3/2005 | 13 14 15 16 17 18 19 | |
| | ◯ | | | User | Community | Community Meeting Time Change | 1/3/2005 | 20 21 22 23 24 25 26 | |
| | ◯ | | | User | Post Office | Mail Communication | Expected 1/3/2005 | 27 28 Import Calendar | |

| myInboxes | P ? – |
|---|---|
| 2701 Riverside Dr. (5 Unread) | |

| myStorage | P ? – |
|---|---|
| ▲ Public | |
| ▲ Personal | |
| ▲ Secure | |

FIG. 6

| ►Homepage | ►Mailbox | ►Community | ►Marketplace | ►Options | | | | Francais Signout |
|---|---|---|---|---|---|---|---|---|

Inbox – 2701 Riverside Dr. – 3 Unread Mail Items | /FindMe | Home | ▼ | P | ? | – | /Live Agent Help | ?

Community for
www.domain.ca/K1A0B1/2701Riverside

| /Local Business Directory | | P | ? | – | /Car Pool | P | ? | – |
|---|---|---|---|---|---|---|---|---|
| ● Business Name ○ Category | Search | | | | 3 Car Pools available in your area. View Car Pools | | | |

| Browse Local Businesses by Category | |
|---|---|
| ►Agriculture, Fishing & Forestry | ►Health & Medicine |
| ►Apparel & Accessories | ►Home & Garden |
| ►Automotive | ►Industrial Supplies & Services |
| ►Business & Professional Services | ►Personal Care |
| ►Computers, Communications | ►Public Utilities & Environment |
| ►Construction & Renovation | ►Real-Estate & Insurance |
| ►Education | ►Shopping & Specialty Stores |

| /News | P | ? | – |
|---|---|---|---|
| This Weeks Events | This Weeks News |
| ▪Community group meeting | Saturday |
| ▪Yard Sale | Sunday |
| ▪Fundraiser | Monday |
| ▪Street Party | Tuesday |
| Add an Event | Full Calendar |

| /Community Discussions | | | P | ? | – |
|---|---|---|---|---|---|
| Subject | Replies | Last Post By | Last Post | | |
| Public transit re-scheduling... | 4 | User 1 | Yesterday | ◄ | |
| Safe drinking water | 6 | User 2 | Today | | |
| Snow removal | 2 | User 1 | 01/04/2005 | ► | |

| /Classifieds | P | ? | – |
|---|---|---|---|
| ▪1 Bedroom Apt. --First month Free |
| ▪Guitar |
| ▪366MHZ Notebook |
| ▪42" TV |
| ▪Router Table |
| View Full Listing |

▲Homepage | ▲Mailbox | ▲Community | ▲Marketplace | ▲Options | | | Francais Signout Inbox – 2701 Riverside Dr. – 4 Unread Mail Items | FindMe | Home | ▼ | P | ? | Live Agent Help | ?

Options for
www.domain.ca/K1A0B1/2701Riverside

Electronic address Homepage Preferences | P | ? | –

| My Account | Marketing | Location | Inbox | Wallet | Time | Storage |

Save with bundles!
You can always pay-as-you-go or you can save with bundles.

| Service | Basic – FREE! | Your Usage | Express $9.95 / month | Premium $29.95 / month |
|---|---|---|---|---|
| Storage | 100 MB | 89 MB (89%) | 1 GB | 5 GB |
| Video Rentals | 1 | 0 | 3 | 5 |
| Music Downloads | 2 | 1 | 10 | 25 |
| Magazine Subscriptions | 0 | 0 | 1 | 2 |
| Website Subscriptions | 1 | 1 | 3 | 5 |
| TV On Demand | 0 | 0 | 3 | 5 |
| Game Rental | 0 | 0 | 1 | 3 |
| | | | Upgrade Now! | Upgrade Now! |

Your monthly charges can be applied to: ○ Provider 1 Account ○ Provider 2 Account ○ Credit Card

FIG. 13

| Geographic Locator Address 52 | Electronic Address 54 | Preference(s) 56 | Other Information 58 |

ELECTRONIC CONTENT MANAGEMENT SYSTEMS AND METHODS

CROSS-REFERENCE TO RELATED APPLICATIONS

This application is a continuation of U.S. patent application Ser. No. 11/505,314, filed on Aug. 17, 2006, which claims the benefit of U.S. Provisional Patent Application Ser. No. 60/708,756, filed on Aug. 17, 2005, the entire contents of both of which are incorporated herein by reference.

FIELD OF THE INVENTION

This invention relates generally to management of information and, in particular, to managing electronic content using unique geo-specific electronic addresses.

BACKGROUND

Electronic addresses such as e-mail addresses and Internet addresses are typically associated with particular entities or people, and can quickly become outdated. E-mail addresses used for transfer of e-mail according to the Simple Mail Transfer Protocol (SMTP) and Post Office Protocol (POP), for example, can be Internet Service Provider (ISP) specific, and accordingly are quite often simply abandoned whenever an e-mail user changes ISPs. Although one would normally advise friends, family, and business contacts when relocating to a new home, the same care is not often taken keep electronic addresses current.

Those familiar with electronic addresses, and particularly e-mail addresses, will also appreciate the high numbers of communications which can be received, including those that have not been solicited. Unwanted e-mail messages can quickly accumulate, making it more difficult for users to identify important messages and process their communications.

For these and other reasons, electronic addresses—particularly e-mail addresses—are often regarded as an unreliable transfer mechanism for important information. Financial institutions and other businesses, for instance, tend to be reluctant to use e-mail addresses and other electronic addresses for official client or customer communications.

Mailing addresses to physical locations, on the other hand, represent a preferred communication channel for many organizations, and accordingly, businesses and individuals alike tend to be more careful to ensure that mailing address information is kept up to date.

In addition, whereas mailing addresses are normally associated with geographic or physical locations, electronic addresses have no such association. For example, an advertiser that wishes to target a particular geographic area can relatively easily have information delivered to all mailing addresses in a neighbourhood based on street addresses or a postal code for instance. Although an electronic campaign would often save both resources and costs, conducting a geographically targeted campaign using electronic addresses would be difficult without prior knowledge of a complete, accurate and current electronic address for every intended recipient.

In some cases, information is time-critical, which would favor electronic distribution over mail-based distribution. Public safety warnings in a specific area, for example, could be distributed to electronic addresses very quickly, but only if public safety authorities maintained accurate electronic address records.

Currently available location-based electronic addressing schemes are limited only to e-mail messages. In one instance, where an intended recipient's e-mail address is not known, a street address or location may instead be used as an address in an e-mail message. However, these schemes are prone to some of the same shortcomings as conventional electronic addressing, in that e-mail messaging is tied to existing e-mail accounts, and addresses are not protected from use for unsolicited communications.

SUMMARY OF THE INVENTION

Embodiments of the invention provide for improved electronic content management. Physical location addresses such as mailing addresses, which are also more generally referred to herein as geographic locator addresses, are associated with unique electronic addresses. The electronic addresses are addresses which are used within an electronic content management system to deliver electronic content from only authorized senders or sources to authorized receivers. A closed content management system in which the use of electronic addresses is managed and controlled allows transfer of electronic content to geo-specific electronic addresses while at the same time offering a level of control over unsolicited communications.

According to one aspect of the invention, there is provided a system for managing electronic content. The system includes an interface operable to receive information that is to be distributed to a geographic locator address, and an electronic content distribution module operatively coupled to the interface and operable to determine an electronic address that is uniquely associated with the geographic locator address, and to make electronic content, which comprises the received information, available through the determined electronic address.

The electronic content distribution module may be operable to determine the electronic address by accessing an address store in which the geographic locator address is uniquely mapped to the electronic address.

The system may also include an address converter operable to convert geographic locator addresses into respective uniquely associated electronic addresses, and to store the electronic addresses in the address store. The address converter may be operable to convert geographic locator addresses into respective uniquely associated electronic addresses by applying an address schema to the geographic locator addresses.

In some embodiments, the address converter is further operable to determine whether the geographic locator address to which the received information is to be distributed has an associated electronic address in the address store, and to convert the geographic locator address into the associated electronic address where the geographic locator address does not have an associated electronic address in the address store.

The electronic address may be a Uniform Resource Locator (URL), in which case the electronic content distribution module makes the electronic content available through the electronic address by posting the electronic content to the URL.

The system may also include a secure host system for hosting the electronic address, the secure host system controlling access to the electronic content through the electronic address in accordance with a security policy. The security policy may require at least one stage of user authentication.

The electronic content distribution module may be further operable to process the electronic content according to a content schema, and to make the electronic content available by making the processed electronic content available through the electronic address.

In some embodiments, the interface is further operable to receive geographic locator address information identifying the geographic locator address.

Where the received geographic locator address information identifies a plurality of geographic locator addresses, including the geographic locator address, to which the received information is to be distributed, the electronic content distribution module may be further operable to determine respective electronic addresses uniquely associated with the plurality of identified geographic locator addresses, and to make the electronic content available through each of the determined electronic addresses.

The electronic content distribution may be further operable to determine whether the received geographic locator address information comprises partial information for identifying a plurality of geographic locator addresses including the geographic locator address, for example, and if so, to determine respective electronic addresses uniquely associated with the plurality of geographic locator addresses and to make the electronic content available through each of the determined electronic addresses.

In some embodiments, the electronic content distribution module is further operable to determine whether the received information satisfies a preference configured for the geographic locator address, and to make the electronic content available only if the received information satisfies the preference.

The electronic content distribution module may be further operable to determine a type of the received information, and to process the received information according to the determined type. The received information may include a tag indicating its type, in which case the electronic content distribution module is operable to determine the type of the information based on the tag. Respective tags in the received information may indicate at least one of: an action to be triggered by the electronic content, software application activity to be triggered by the electronic content, whether a response to the electronic content is required, whether the electronic content comprises a transactional element, and if so, a kind of the transactional element.

In some embodiments, the electronic content distribution module is further operable to convert the received information into the electronic content. This may be accomplished by determining a delivery preference for the received information and converting the received information into the electronic content where the delivery preference is electronic delivery.

The electronic content distribution module may be further operable to identify as the geographic locator address to which the received information is to be distributed a geographic locator address for which the electronic content has local significance. In this case, the interface may be further operable to receive a request for the electronic content from the electronic address, and the electronic content distribution module may be operable to make the electronic content available responsive to the received request.

A method of managing electronic content is also provided, and includes receiving information that is to be distributed to a geographic locator address, determining an electronic address that is uniquely associated with the geographic locator address, and making electronic content, which comprises the received information, available through the electronic address.

The operation of determining may involve accessing an address store in which the geographic locator address is uniquely mapped to the associated electronic address. The method may also include converting geographic locator addresses into respective unique associated electronic addresses, and populating the address store using the geographic locator addresses and the unique associated electronic addresses. Determining may also involve determining whether the geographic locator address to which the received information is to be distributed has an associated electronic address in the address store, and converting the geographic locator address into the unique associated electronic address where the geographic locator address does not have an associated electronic address in the address store.

Where the electronic address comprises a URL, making the electronic content available may involve posting the electronic content to the URL.

The operation of receiving may also involve receiving information identifying the geographic locator address.

In some embodiments, the electronic content is to be distributed to a plurality of geographic locator addresses including the geographic locator address, in which case determining may involve determining respective electronic addresses including the electronic address uniquely associated with the plurality of geographic locator addresses, and making the electronic content available may involve making the electronic content available through each of the determined electronic addresses.

The operation of making the electronic content available may involve determining whether the received information satisfies a preference configured for the geographic locator address, and making the electronic content available only if the received information satisfies the preference.

The method may also include determining a type of the received information, and performing type-specific processing of the received information according to the determined type.

The received information may be converted into the electronic content.

The method may include identifying as the geographic locator address to which the received information is to be distributed a geographic locator address for which the received information has local significance.

Such a method may be embodied, for example, in instructions stored on a computer-readable medium.

Another aspect of the invention provides a method that includes generating unique electronic addresses based on respective geographic locator addresses, and uniquely mapping each generated electronic address with the respective one of the geographic locator addresses based upon which the electronic address was generated, to thereby allow the electronic address corresponding to any of the geographic locator addresses to be identified for distribution of electronic content that includes information destined for the geographic locator addresses.

The method may be embodied in instructions stored on a computer-readable medium, for instance.

A Graphical User Interface (GUI) is also provided, and includes an address graphical element displaying an indication of an electronic address for accessing the GUI, the electronic address being uniquely associated with a geographical locator address, and a content graphical element displaying electronic content including information that was destined for the geographical locator address and distributed to the electronic address.

In accordance with a still further aspect of the invention, a computer-readable medium that stores a data structure is provided. The data structure includes a geographic locator address, an electronic address generated on the basis of the geographic locator address, and an indication of a unique association between the geographic locator address and the electronic address, the association enabling the electronic address to be identified for distribution of electronic content that includes information destined for the geographic locator address.

The data structure may also include an indication of a preference in accordance with which distribution of electronic content to the electronic address is controlled.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which:

FIGS. 5-16 are representations of display screens for presenting electronic content; and FIG. 17 is a block diagram of a data structure.

DETAILED DESCRIPTION OF PREFERRED EMBODIMENTS

Figure 1:
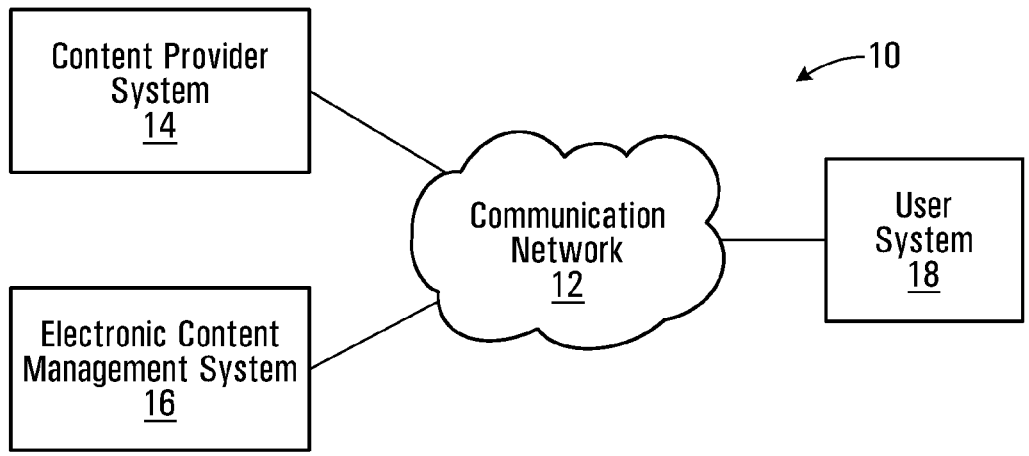
FIG. 1 is a block diagram of a communication system.

FIG. 1 is a block diagram of a communication system. The communication system 10 includes a communication network 12 through which a content provider system 14, an electronic content management system 16, and a user system 18 communicate. Although many content provider systems, electronic content management systems, and user systems may be connected to the communication network 12, only one example of each type of system has been shown in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein. Other embodiments of the invention may include fewer, further, or different components or operations which are interconnected or interact in similar or different ways than specifically described herein.

The communication network 12 represents a collection of equipment, such as switches and routers, that enables communications between the systems 14, 16, 18. Equipment in the communication network 12 may be operatively coupled through virtually any type of connection over which communication signals can be exchanged. Connections may include wired connections, wireless connections, or some combination thereof. The communication network 12 may include public transport systems such as the Internet, private networks, or both.

The particular types of connections and communication signal exchanges available in the communication network 12 is at least to some extent dependent upon the type of the equipment used to implement the network, the protocols used in the network, the type of equipment for which the connections are established, for instance, and/or possibly other factors.

The present invention is in no way limited to any particular type of communication network, or even to communications involving a network. For example, the electronic content management system 16 may be directly connected to the content provider system 14 and/or the user system 18.

The content provider system 14 is a system, illustratively a server or other computer system, which at least provides electronic content to be delivered to the user system 18. Information to be forwarded through the electronic content management system 16 to the user system 18 may originate in electronic form or be generated through some sort of conversion, such as by scanning a paper document. The content provider system 14 may thus include a data store for storing electronic content, one or more converters such as a scanner for converting information into electronic content, or both. These components need not necessarily be local to the content provider system 14. Electronic content may also or instead be retrieved from a remote store and/or received from a remote converter in some embodiments.

Content may include, for example, any or all of statements, bills, marketing materials such as brochures, and voting ballots. In one embodiment, a retailer might implement its own electronic content provider system or use an external electronic content provider system to electronically distribute electronic copies of its physical flyers or coupons. Content, in electronic or possibly physical form as noted below, is sent by the provider system 14 to the electronic content management system 16 for distribution. A public opinion polling company could similarly distribute blank ballots electronically, through the electronic content management system 16. Completed ballots could then be returned to the provider system 14 through the electronic content management system 16, or possibly to a different system. Thus, a content provider system 14 may send, receive, or both send and receive content.

As will be apparent, the content provider system 14 may include an interface, which would be a communication network interface in the system 10, for exchanging electronic content with the electronic content management system 16 through the communication network 12.

The electronic content management system 16, which may also be implemented using one or more computer systems, similarly includes a network interface or other interface for receiving content from and possibly sending content to the provider system 14. An example electronic content management system 16 is described in further detail below with reference to FIG. 2.

As noted above, the content provider system 14 may include one or more converters for converting paper documents, for example, into electronic content. The electronic content management system 16 may also or instead include such converters. In one embodiment, a converter may be provided in the form of a mail processing plant's inline multi-line optical character recognition (MLOCR) equipment which scans and images envelope faces going through a mail system. Electronic content in this case could be an envelope image transmitted as an alert of a communication en route in the mail system.

Figure 4:
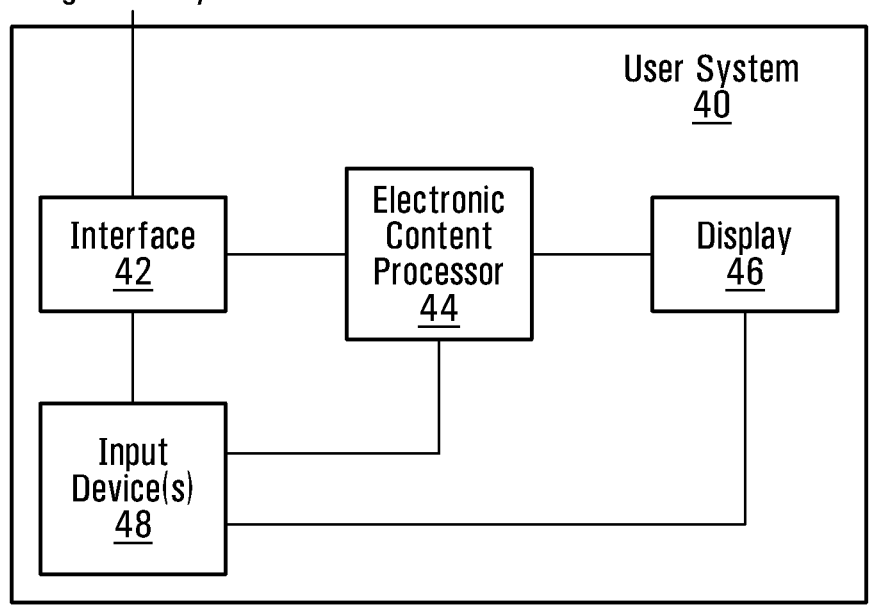
FIG. 4 is a block diagram of an electronic content user system.

The user system 18 represents equipment such as a personal computer through which a user of an electronic content management service of the system 16 accesses electronic content. FIG. 4 illustrates an example of a user system, and is described in detail below.

In operation, the electronic content management system 16 supports geo-specific addressing for electronic content, managing relationships between geographic locations and respective, corresponding, unique electronic addresses, and acts as an intermediary between the content provider system 14 and electronic addresses through which electronic content is made available to the user system 18. Operation of the communication system 10, and in particular the electronic content management system 16, will become apparent with reference to FIG. 2 and the following description thereof.

Figure 2:
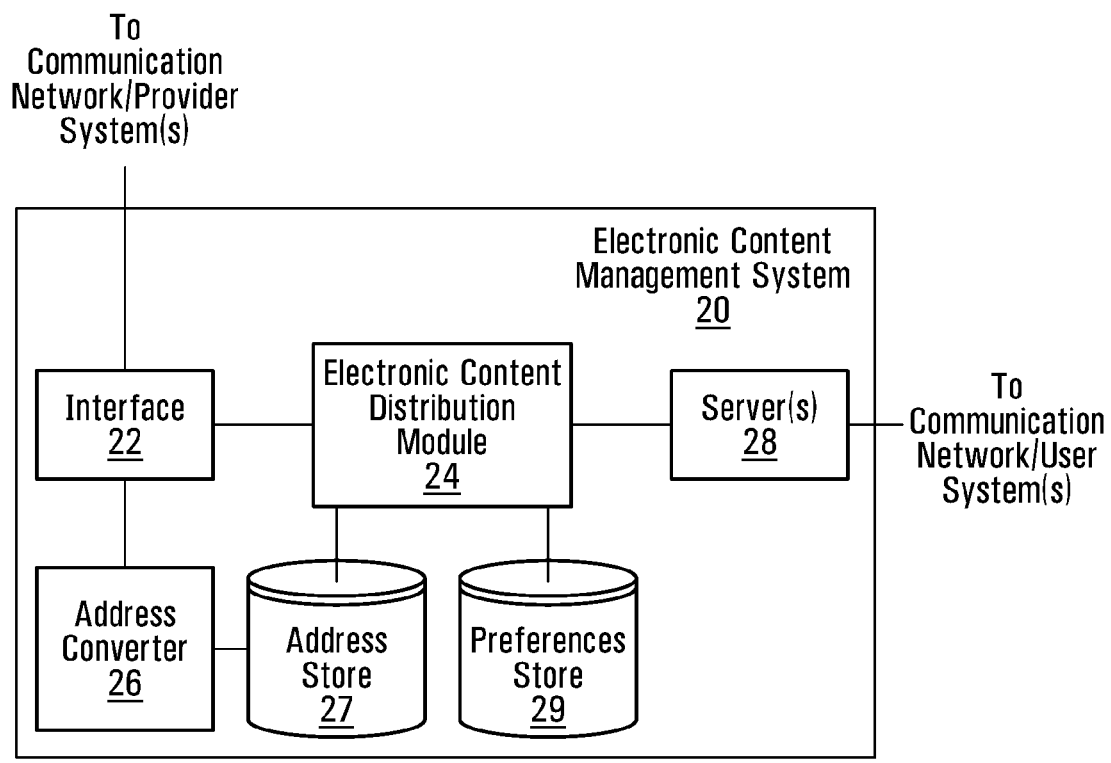
FIG. 2 is a block diagram of an electronic content management system.

FIG. 2 is a block diagram of an electronic content management system 20. As shown, the electronic content management system 20 includes an interface 22, an electronic content distribution module 24 operatively coupled to the interface 22, an address converter 26 operatively coupled to the interface 22, an address store 27 operatively coupled to the electronic content distribution module 24 and to the address converter 26, one or more servers 28 operatively coupled to the electronic content distribution module 24, and a preferences store 29 operatively coupled to the electronic content distribution module 24.

The specific components shown in FIG. 2 are intended solely for illustrative purposes. Fewer, further, and different components with similar or different interconnections may be implemented in other embodiments.

Although shown in FIG. 2 as a single system 20, it should be appreciated that the components of the system 20 may be distributed, such as in a communication network 12 (FIG. 1). Not all components need necessarily be co-located. Multiple servers 28 may be provided in a communication network, for example, and operatively coupled to the electronic content distribution module 24 through network connections. Various types of interconnection between components are therefore possible, including local, short-range connections and longer-range connections between remotely located components. Logical interconnections between components are also contemplated, where components are implemented in software. In this case, a "connection" might be through common registers or variables as opposed to a physical connection. The present invention is substantially independent of any particular type of operative coupling or connection between components.

The interface 22 includes one or more interface devices for exchanging electronic content, and possibly other information, with external systems. Different types of interfaces may be provided to enable communications with different types of external systems or over different connections. With reference to both FIGS. 1 and 2, the interface 22 may include an interface which enables communication with the content provider system 14 through the communication network 12. A transceiver, for example, may support such functions as modulation and demodulation, frequency conversion, filtering, and gain control for generating and processing communication signals.

Hardware, software, firmware, or some combination thereof may be used in implementing the interface 22. Software may be stored in a memory (not shown) for execution by one or more processors such as a microprocessor, an Application Specific Integrated Circuit (ASIC), a Digital Signal Processor (DSP), or some other type of processor.

The particular type and implementation of the interface 22 is dependent to at least some extent on the type of communications and network access mechanisms to be supported by the electronic content management system 20.

Either or both of the electronic content distribution module 24 and the address converter 26 may similarly be implemented using hardware, software, firmware, or some combination thereof. In one embodiment, the electronic content distribution module 24 and the address converter 26 are implemented as software applications which are executed by a microprocessor in a computer system.

The address store 27 and the preferences store 29 include one or more memory devices for storing information which is used by the electronic content distribution module 24 as described in further detail below. Solid state memory devices and/or other types of memory devices such as disk drives may be used to implement either or both of the stores 27, 29. Although shown as separate blocks in FIG. 2, the stores 27, 29 may be provided in the same memory device. These stores 27, 29 may be local to a computer system in which the electronic content distribution module 24 and/or the address converter 26 are implemented, or remote stores provided at a file server, for example.

As described in further detail herein, the electronic content management system 20 establishes electronic addresses through which electronic content is made available to user systems. In one embodiment, this involves creating an internal system of geo-specific sub-domains.

The content management system 20 and specifically the electronic addresses may be "private" inasmuch as they could be controlled by an administrating organization and are for the exclusive use of authorized content providers and recipients/users. The electronic addresses may be published, and address converters or translation instructions may also be provided to subscribing content providers and possibly also to users so that the content providers/users may determine electronic addresses for content distribution based on geographic locator addresses. In any event, a content provider or user familiar with the content management system 20 may readily understand the electronic address formatting rules once they are aware of geographic locator address to electronic address correspondence. Based on his or her own geographic locator address and corresponding electronic address, for example, a user may be able to determine the electronic address which corresponds to another user's geographic locator address. However, the system and the electronic addresses may be protected and kept "private" by establishing access restrictions on sending and/or receiving content through a content management system.

These electronic addresses may be hosted by one or more host systems, such as the server(s) 28. In one embodiment, the electronic addresses are associated with Web pages having Uniform Resource Locators (URLs) which are hosted by a server 28. Multiple servers 28 may be provided, depending upon the number of electronic addresses.

It will be appreciated that the particular structure of the server(s) 28 may vary depending upon the type of communication used by the electronic content distribution module 24 to make electronic content available and the user system access mechanisms to be supported. In general, a server 28 would include an interface for exchanging information with the electronic content distribution module 24, an interface for exchanging information with user systems, and a data store for storing electronic content. According to one possible implementation, the server(s) 28 are deployed in a communication network, and the same interface supports communication with both the electronic content distribution module 24 and user systems through a communication network.

Geo-specific electronic addresses through which electronic content is made available may be generated during initial configuration of the system 20. In one embodiment, physical location information such as mailing addresses are converted into respective unique electronic addresses by the address converter 26.

Physical location information, illustratively mailing addresses, may be available to the address converter 26 through any of various channels. A content provider, for example, may extract mailing addresses from its own Customer Relationship Management (CRM) system and transmit these mailing addresses to the electronic content management system 20 for generation of corresponding electronic addresses. Mailing addresses might instead be assembled by an operator of the system 20, illustratively a postal authority, and manually entered or otherwise provided to the address converter 26. Although mailing addresses or other geographic locator addresses may be received or collected from multiple sources, a particular locator address is converted to a corresponding electronic address only once in some embodiments.

The electronic content management system 20 may have minimum requirements for address conversion operations. For instance, a mailing address may be required to include such information as a street address, a suite number, a postal code, zip code, or other address code, and possibly additional and/or different information to comply with standards set for an addressing protocol of the electronic content management system 20.

Physical location information, regardless of its source, may be used by the address converter 26 to generate new and unique electronic addresses. The address converter 26 may process the physical location information which it receives or otherwise obtains by applying an address schema. In one embodiment, the schema tags individual data elements of mailing address records to allow each data element to be manipulated within the system 20 for such purposes as relating to other tags and processing or dynamic generation of electronic content to be made available through electronic addresses.

The addressing schema is the result of a geo-specific conversion of physical data to an electronic format. In one embodiment, data within the schema has appropriate tags, and the following geographic locator address data elements are used in the address conversion process: postal code, street number, street name, and street type. Data in the mailing address 2701 Riverside Drive, K1A 0B1, for example, could be tagged as follows:

PostalCode—k1a0b1
StreetNumber—2701
StreetName—Riverside
StreetType—Drive, and the resulting electronic address, illustratively a URL, could be http://www.domain.ca/k1a0b1/2701/riversidedrive.

The address schema used by the address converter 26 effectively defines the format of an address data structure according to which address information is stored in the address store 27.

Received physical location information may be converted by the address converter 26 as it is received, with the physical location information and corresponding addresses then being stored in the address store 27. The address converter 26 may also or instead automatically convert all physical location information records in an address directory, for example. In this case, received physical location information may be stored in the address store 27 and then accessed by the address converter 26 to create corresponding electronic addresses which are also then stored in the address store 27.

An association between physical locations and electronic addresses might be inherent in the format or data structure used to store information in the address store 27. For example, the address store 27 might include records for each physical location for which an electronic address has been generated, with each record including a physical location data field storing an indication of a physical location and an electronic address data field storing an indication of the electronic address corresponding to the physical location. Flags, explicit indexing, and other techniques may be used to associate physical locations with corresponding electronic addresses.

Physical location information and corresponding electronic addresses may be validated in order to create and maintain system integrity. For example, performing address conversion only once per geographic locator address and verifying the existence of only a single electronic address corresponding to a geographic locator address avoids repeated conversions for the same geographic locator address and ensures that a geographic locator address is uniquely associated with only one electronic address.

It should also be appreciated that electronic content management as disclosed herein may be implemented without the address store 27. Electronic addresses may instead be generated when electronic content and destination physical locations are received from a content provider.

This latter approach might not be feasible in all implementations, however, such as where mass distribution of electronic content is to be supported. "On-the-fly" address conversions could consume significant processing resources and cause delays when electronic content is intended for distribution to many locations.

According to one particular embodiment of the invention, the electronic addresses generated by the address converter 26 are individual geo-specific subdomains under a master domain. Each subdomain may have standard templates that include, among others, "sign-on", "envelope", and various user functionality screens/features. A sign-on template allows the system 20, and specifically the server(s) 28 in the example shown in FIG. 2, to apply a secure sign-in registration and authentication protocol to ensure that each individual subdomain is accessible only by authorized users. To be authorized as a primary user, for example, a user could be required to personally attend a service location such as a postal outlet for in-person proofing. Access for secondary users could then be configured by the primary user(s). In-person proofing of at least the primary user, and possibly the secondary user, also provides an opportunity to distribute access tokens or other equipment which would allow two-factor user authentication to be applied for access to electronic content.

Other security mechanisms may also or instead be applied for access control. A server 28 may thus be regarded as a secure host system for hosting electronic addresses and controlling access to electronic content through the electronic addresses in accordance with a security policy. The security policy may be a default policy applied by every server 28, or possibly a configurable policy which can be customized on a per-server, per-electronic address, or other basis. The user authentication protocol noted above is an example of a security requirement which may be specified as part of a security policy. Security policy information may be downloaded to the server(s) 28 when electronic addresses are generated by the address converter 26. Security policies may also or instead be established or amended from time to time by a content provider (requirement definition), a user (preference setting), and/or an administrator of an electronic content management system (system security standards).

Several options for electronic address generation have been described above. In accordance with embodiments of the invention, the electronic content management system 20 uses these electronic addresses to act as an intermediary for electronic content distribution between a content source and user systems.

A content source may provide to the electronic content management system 20 an indication of a physical location, in the form of a mailing address for example, and information to be delivered to an addressee (even "occupant") at a specific physical location. As noted above, a content provider may have the capability of extracting relevant address data, such as name, customer number, mailing address, and other fields, from their own CRM system, although addresses need not necessarily be provided with the actual information that is to be distributed. The information itself may be in electronic form, or possibly in another form that is converted into electronic content by the system 20.

In some embodiments, the electronic content management system may include one or more converters for converting content, paper documents for instance, into electronic content to be made available to a user through a geo-specific electronic address. One possible extension of this feature would involve allowing a user to specify, as a preference for example, whether communications are to be sent in electronic form or another form. A user might prefer to receive physical copies of some communications and electronic copies of others.

A content provider need not necessarily be aware of a user's format preferences. The system 20 may receive a paper brochure from a mailer for distribution to users, and distribute the brochure to users in preferred formats. For users preferring electronic content, the brochure would be converted by the system 20 into electronic form. Conversion of information from electronic to physical form is also contemplated.

The data transferred from a content provider to the system 20 may thus include one or more target physical locations and information to be delivered to the target locations. In one embodiment, the information is specified as contents of a message template which includes predetermined formatting and text/graphics. Special instruction tags to identify the type of the information and/or the type of the electronic content may also be provided. Where electronic content is to be used by a particular software application or function at a user system, the content provider may specify the application or function, for soliciting or handling a response, tracking delivery, etc.

The electronic content distribution module 24 receives the physical location and content information through the interface 22 and identifies an electronic address which is uniquely associated with the specified physical location. The electronic content is then made available through the electronic address.

The operation of identifying the electronic address(es) through which electronic content is to be made available may involve accessing the address store 27. As described above, the address store 27 maps physical locations to corresponding electronic addresses.

In some embodiments, it may be desirable to support some level of on-the-fly electronic address generation in order to allow new physical locations to be added when content is provided to the electronic content management system 20 by a content provider. For example, a content provider might not wish to have to update the electronic content management system 20 every time a new customer is added to its CRM system. The content provider may instead perform address conversions and forward electronic addresses to the system 20 along with content, thereby avoiding a need for on-the-fly address conversion at the system 20.

Thus, in some embodiments, a content provider can submit addressing information in either geographic-locator or electronic correspondent form, and a content management system will accommodate that submission. As described in further detail below, a content management system may further perform integrity checks to ensure that, regardless of the form in which address information is submitted, there will be only valid electronic addresses in the output.

The address converter 26 could be configured to validate a geographic locator address, by ensuring that the address exists, is valid, and does not have aliases (by consulting an address registry for instance). The address converter 26 may also or instead determine whether a recipient geographic locator address already has one and only one associated electronic address in the address store 27, and if not, convert the geographic locator address into a corresponding electronic address. This allows new geographic locator addresses to be added, while avoiding content provider to management system updates for every new geographic locator address which is added to a content provider's records.

It will thus be apparent that the address converter 26 may query and, where necessary, create new electronic addresses corresponding to geographic locator addresses. This ability may in some embodiments support a further function of maintaining the integrity of each electronic address relative to its associated geographic locator address, thereby ensuring data integrity within a geographic locator address directory.

The electronic content distribution module 24 may process received content before the content is made available through a user system and the electronic address(es). Received data, for instance, may be applied to a document template specified by a content provider and/or processed through a specific content schema structure. A document template might be specified by a content provider using an identifier such as a <template id> tag.

Received content, or processed content in some embodiments, is made available through the electronic address(es) associated with the intended recipient physical location(s). In the system 20, this is accomplished by sending the content to the server(s) 28 which host the electronic address(es). According to one embodiment, the system 20 makes content available by posting to each electronic address, such as through HyperText Transfer Protocol (HTTP) secured with Secure Sockets Layer technology (HTTPS), not by delivering content to an individual's SMTP/POP e-mail client's mailbox as in the case of e-mail.

A user may then access the electronic content through the electronic address. This may involve using a user system to connect to and authenticate with a server 28. The user, once authenticated, is presented with the electronic content, which in some embodiments has been dynamically generated and properly formatted using a document template. As will be apparent to those skilled in the art, a browser may be used to access electronic content, posted to a Web page by the system 20, via Secure Sockets Layer (SSL) or some other secure link. Other access mechanisms may also or instead be supported.

According to one embodiment, a form of an "electronic envelope" is delivered to a subdomain address. The envelope may be "sealed" in the sense of having only basic tombstone address data (i.e., address and addressee name/identifier, sender name, etc.) visible and accessible, requiring a shared secret or other secondary authentication (e.g., password, presentation of an account number, etc.) to open and view details. This allows content for multiple individuals, family members for example, to be delivered to a single electronic address associated with a physical location, while allowing only the individual or anyone else that can provide required authentication/security information to fully view the content.

The essence of the electronic or digital envelope is revealed in the two-step authentication approach that a recipient may be required to undergo to see "personal" content. That is, upon first authentication to access an electronic address, tombstone information (i.e., addressee, address, sender, type of communication) is revealed, substantially as though one were looking at the outside of a physical envelope. A second stage of authentication which may be required to view specifically-addressed content may be similar to, but possibly more rigorously controlled than, opening an envelope. Once second stage authentication has been successfully completed, the authorized, authenticated, specific addressee has the detailed content revealed to him/her.

The two-stage authentication process for specifically-addressed personal content, which is intended for a particular one of multiple users at the same physical location, relates to a triangular connection that is created between addressee, address (a physical location which is possibly manifested as an electronic equivalent or "gateway"), and content. That is:
- a connection between addressee and content exists by virtue of the direct connection of (private) information between sender and recipient, be that an advertising communication, a summons, or a bill for instance;
- a connection between addressee and address exists by virtue of the addressee publishing or warranting in some way that connection (i.e., assuring the other party to a relationship or future communication that the—physical—address is "tied" to him/her for the purpose of communication); and
- a connection exists between the content and the address because the only way for the content to be "delivered" from point 'A' is to have a target point 'B' which may or may not be physical.

The secure and personal aspects of the proposed system paradigm, and of any other communications paradigm, are ensured by these three connections in some embodiments. The present invention introduces the premise that value and validity for certainty, legality, security, etc., is substantially enhanced by the ultimate geo-specific anchoring of electronic addresses. So, regardless of the communication media employed in the connections, a message is getting to a specific person at a specific "place", which is significant because of the traditional assumption of completion of a communication if it arrives at its intended destination.

Various types of electronic content may be managed by the system 20. Electronic content may solicit or require a response from a user, such as to pay a bill or respond to a voting/polling/proxy request for instance. In this case, the system 20 may track such information as the content provider from which electronic content was received, electronic addresses through which the content was made available, and a particular user system application or function to be used to generate responses. Responses received from those electronic addresses can then be properly transferred to the correct content provider, or possibly to another designated destination. Handling of responses for transfer to an originating provider or designee, in batch or in real-time for instance, may be in accordance with instructions received from the originating provider or content management system policies.

This type of functionality may be implemented, for example, in the electronic content distribution module 24, and invoked when particular types of electronic content are received from a content provider.

Different types of content may thus be handled in different ways by the electronic content distribution module 24 and other components of the system 20. The electronic content distribution module 24, for example, may identify a type of received information or content and process that information or content accordingly. The interactive response capabilities described above are one example of type-specific processing operations.

Other examples include a content transfer from a content provider which is tagged <statement> and has no associated response action. This content communicates information, such as a statement of account, without requiring a response. Content tagged <brochure> might be a marketing brochure or offer that does not expect but accommodates within its structure the opportunity to move a recipient user seamlessly into a shopping environment, offer a secondary call-back or quotation service, etc. Another content transfer might be tagged <bill>, and processed by the electronic content distribution module 24 to allow for additional functions such as adding a payment due date into a calendar and payment processing by a user at a user system. A still further type of content could bear the tag <proxy>, which could again be processed by the electronic content distribution module 24 to allow population of a calendar and remission of a yes/no response to a designated third party for each proxy question (i.e., voting), etc. These and other types of metatags may isolate software applications from within the many standards in stock, or even in open source among the provider-user community, which content providers can include for action and interaction with users.

Some basic electronic content management functions of the system 20 according to embodiments of the invention have been described. Additional optional functions and interactions with other components which have not been explicitly shown in FIG. 2 are also contemplated.

For example, transactions including either or both of originating and response transactions may be processed through the system 20 with the application of further mechanisms such as electronic post marking. An electronic post mark provides a visual indication, viewable by content providers and users, that verifies time of processing by the system 20. Electronic post marks may also allow integrity of content to be checked, where a hash or other transformation of content is used to generate the electronic post marks. Archived electronic post marks and/or transformed content could be used for non-repudiation and general storage purposes. An electronic post marking function or an analogous function might be incorporated into an electronic content management system, illustratively in the electronic content distribution module 24 or one or more of the server(s) 28, or provided by a separate system with which an electronic content management system can interact.

Another function which may be supported in an electronic content management system is bulk addressing. The electronic content distribution module 24, for example, might be configured to determine whether a data transfer received from a content provider includes a partial physical location identifier such as a postal code which is common to multiple physical locations, and if so, to identify all electronic addresses in the address store 27 which are associated with the multiple physical locations. In this manner, electronic content could be made available to all locations in a particular area. This function may be particularly useful for distributing time-critical electronic content such as public safety notices throughout a neighborhood without requiring the content provider to separately specify every intended recipient location. This type of functionality may also be useful for distributing "unaddressed" admailings.

A significant advantage of implementing an electronic content management system as an intermediary between content providers and users is that users may have greater control over the content which is delivered to them. The electronic content distribution module 24 may be configured to determine whether electronic content received from a content provider satisfies preferences configured for an intended recipient physical location, and to make the electronic content available at the corresponding electronic address only if the preferences are satisfied. One way of implementing this feature is shown in FIG. 2 in the form of the preferences store 29. A user may manually configure preferences by interacting with the electronic content management system 20 through a user system, so that only locally significant content such as advertising for local businesses is posted to the electronic address corresponding to his or her physical location. Preferences might also indicate specific material and content and/or a preferred delivery mode, such as bills to be delivered physically, statements to be delivered electronically, specifically-directed ads—with multi-media—to be delivered electronically, and other content types to be delivered physically.

Not all electronic content managed by the system 20 need necessarily be destined for particular physical locations specified by a content provider. The system 20 may also receive electronic content for less targeted distribution. A content provider which operates a localized business service might forward content to the electronic content management system 20, or otherwise allow the electronic content management system 20 to access its content, and defer to the system 20 to control the physical locations to which the content is delivered.

In this case, the electronic content distribution module 24 may determine, on the basis of a business address or telephone number for example, physical locations for which the electronic content may have local significance. The electronic content could then be made available through electronic addresses which are associated with the identified physical locations. Electronic content could thus be localized and made available to electronic addresses which correspond to physical locations for which the content may be relevant.

An extension of this feature would be to apply local significance measures to content returned in response to a search or other request. A user performing a search through a Web page which has a geo-specific electronic address linked to the user's mailing address might wish to view relevant business directory or offering records for a particular business category. Instead of returning all results for presentation to the user, the electronic content distribution module 24 may instead limit results to those which are likely are significant to the physical location with which the Web page is associated.

Figure 3:
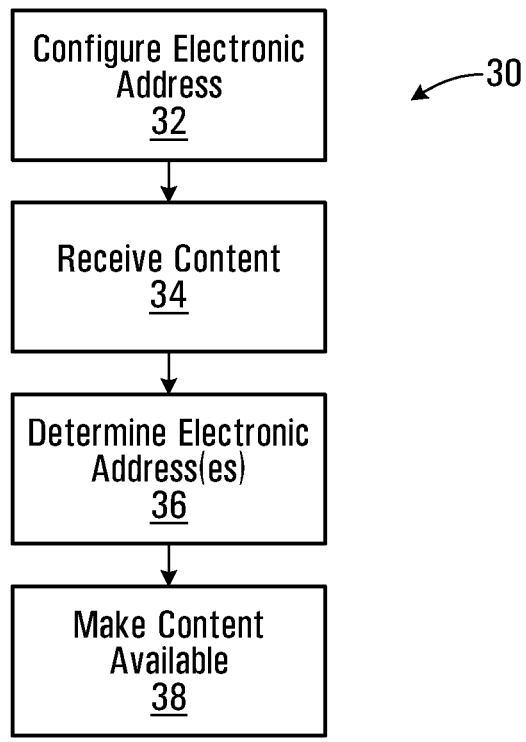
FIG. 3 is a block diagram of a method of managing electronic content.

Content management has been described above primarily in the context of the electronic content management system 20. FIG. 3 is a block diagram of a method of managing electronic content.

The method 30 begins at 32 with an operation of configuring an electronic address which is uniquely associated with a physical location. It is expected that multiple addresses will be configured at 32. At 34, information to be distributed to a physical location, which may or may not be in the form of electronic content, is received. Information specifying the physical location may also be received at 34. An electronic address uniquely associated with the physical location is determined at 36, and the electronic content is made available through the electronic address at 38, by posting to a Web page for example.

FIG. 3 represents a method according to one embodiment of the invention. Variations of the method 30 may be made without departing from the invention. For example, different mechanisms may be used to determine a physical location, or more generally a geographic locator address, to which received information is to be distributed, depending on whether and in what form a content provider supplies the destination locator address. Where a specific destination address is not provided, a local significance mechanism may be employed to determine one or more destination geographic locator addresses and the associated electronic address(es).

Other embodiments of the invention may involve further or fewer operations which may be performed in a similar or different order.

FIG. 4 is a block diagram of an electronic content user system 40. The system 40 includes an interface 42, an electronic content processor 44 operatively coupled to the interface 42, a display device 46 operatively coupled to the electronic content processor 44, and one or more input device(s) 48 operatively coupled to the interface 42, to the electronic content processor 44, and to the display 46. In one embodiment, the user system 40 is implemented using a personal computer.

The interface 42 includes hardware and/or software components such as a modem which enable communication between the user system 40 and an electronic content management system. Any of different types of interfaces may be provided as the interface 42, depending upon the types of communications and access mechanisms to be supported.

The electronic content processor 44, illustratively a software application such as a browser, processes electronic content which is received and/or to be transmitted by the user system 40. The display device 46 displays content to a user of the user system 40, and may include a monitor, for instance. The input device(s) block 48 represents one or more input devices for receiving inputs from a user, such as a mouse and a keyboard.

Operation of the user system 40 will be apparent from the foregoing description of electronic content management systems and methods. A user establishes a connection to an electronic address, or in most cases a remote host system which hosts the address, through the interface 42. For access to Web-based content, establishing this connection would usually involve starting a software application such as a browser which supports content processing functions of the electronic content processor 44, and selecting and/or entering commands using the display 46 and one or more input devices 48.

When a connection has been established and any security requirements such as user authentication have been satisfied, electronic content available to the electronic address may be accessed. In one embodiment, primary authentication allows a user to view digital envelope "tombstone" information and open material content, and secondary authentication is required to access actual information enclosed in the digital envelope.

Although the electronic address itself has an association with a particular physical location, access to the electronic address may or may not necessarily be restricted to a particular user system or location. An electronic content management system could be configured to identify a current location of a user, or more likely a user system, and to grant access when the current location matches or is within a certain distance of the physical location associated with an electronic address being accessed. Restricting access to electronic addresses in this manner may be optional. This feature need not be provided in all embodiments.

The electronic content processor 44 processes electronic content which is subsequently accessed and received through the interface 42. In some embodiments or for certain types of content, a user may send electronic content such as a response, and this electronic content is also processed by the electronic content processor 44 to ensure proper formatting for example.

As noted above, a user may configure certain preferences for electronic content. These preferences might be specified by entering configuration settings using one or more input devices 48 and then transmitted to an electronic content management system through the interface 42. These settings could be first processed by the electronic content processor 44 before being sent to the content management system.

Embodiments of the invention may be implemented in conjunction with additional features and functions, and need not be limited to those explicitly described above. Some of these features and functions will become apparent from the following description of FIGS. 5-16. FIGS. 5-16 show illustrative examples of user interfaces, specifically Graphical User Interfaces (GUIs) or screens which may be displayed at a user system when a user accesses his or her own geo-specific electronic address. It should be appreciated, however, that the invention is in no way limited to the particular screen layouts, content, fonts, etc. shown in FIGS. 5-16. GUI/screen details are a matter of taste and/or design choice, and could be configurable by each user, for example. Accordingly, variations from the specific screens/UIs of FIGS. 5-16 may be made without departing from the invention.

Other details reflected in FIGS. 5-16 may also vary between implementations. In the following description, a mailing address is used as one example of a geographic locator address, and a Web page is used as an example of a mechanism through which a user may access electronic content. Again, it should be appreciated that the present invention is in no way limited to these particular examples.

Figure 5:
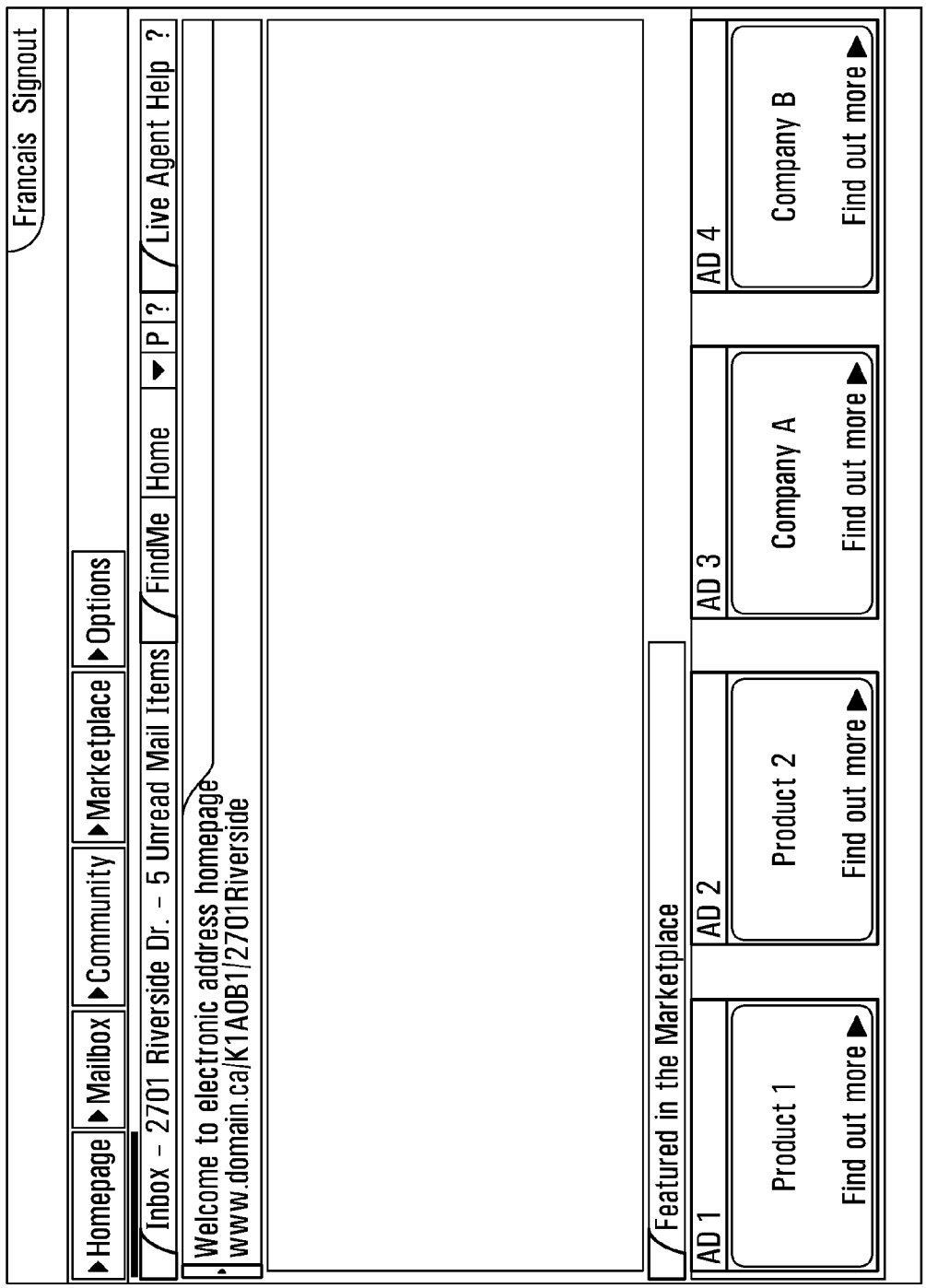

After a user has registered with a content management system, possibly configured a Web page having an electronic address corresponding to his or her geographic locator address, and completed at least a first stage of authentication, the screen in FIG. 5 may be displayed. This is the content access interface that first greets a user after authentication. It may also be the Web page that a user would land on when they enter their electronic address, illustratively a URL, into a browser, except that the user would then be asked to authenticate before getting to any content.

On this screen, access to content is provided via the section tabs across the top of the page. Example tabs are shown in FIG. 5, although further, fewer, and/or different tabs, or other types of access interface, may be provided in other embodiments. The screen shown in FIG. 5 also includes an indication of the electronic address that is uniquely associated with a geographic locator address to which displayed content was destined.

FIG. 6 shows a main "mailbox" screen through which some types of electronic content are available. In the example of the content access screen shown in FIG. 5, the screen shown in FIG. 6 may be displayed when the "mailbox" tab is selected.

Indicators in the left column of the displayed item list indicate different types of "mail", from electronic admailings to bills (financial mailings) to more ad hoc types of mail. The last item in the mail list, for instance, is an electronic representation of physical mail that is being delivered through the postal system, and provides an anticipated arrival date. As shown, some items are locked and would require secondary authentication before content other than tombstone information can be accessed.

The mailbox screen also includes an indication of the electronic address associated with the displayed content.

Figure 7:
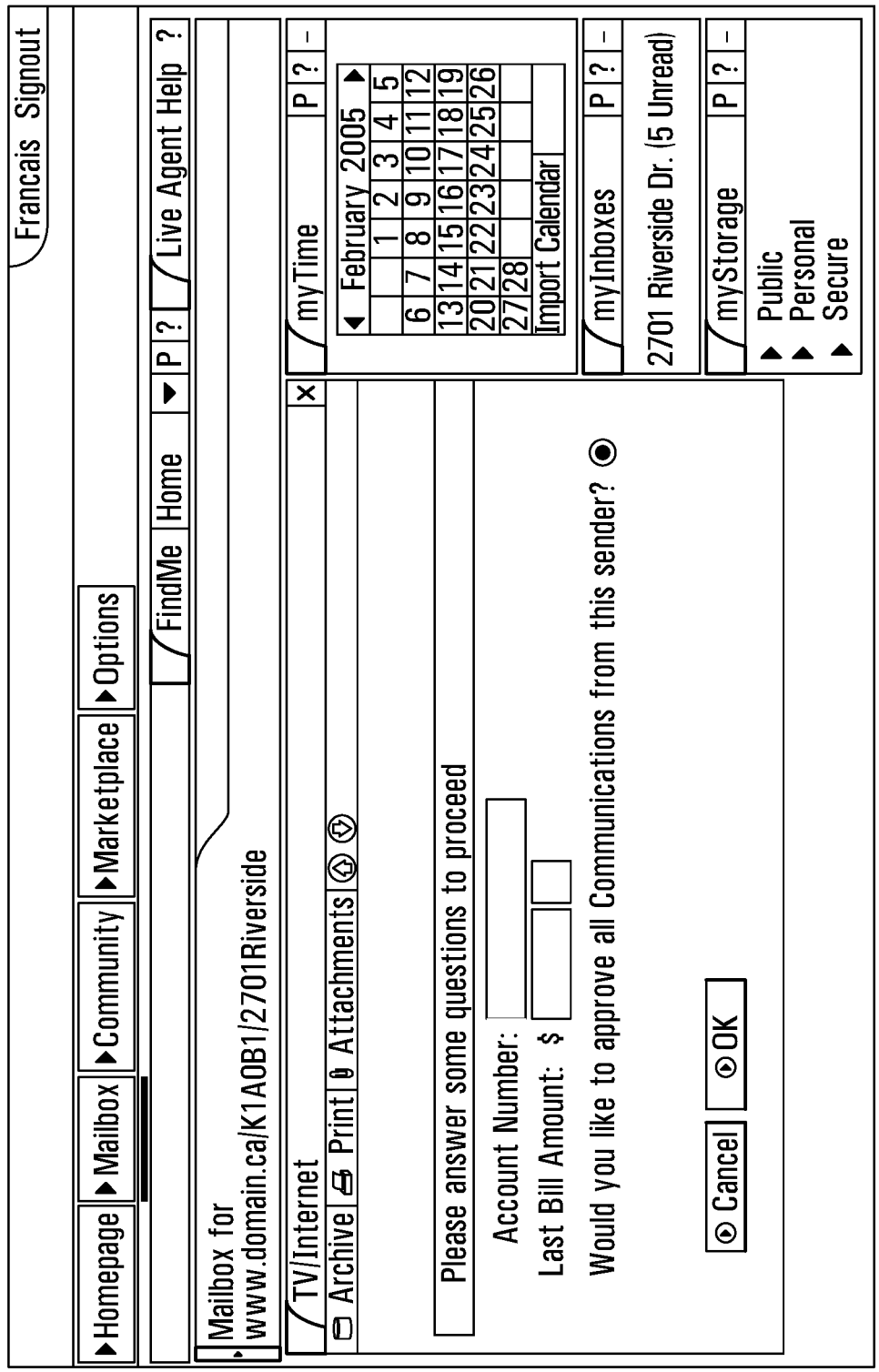

FIG. 7 shows a screen through which secondary authentication is requested, in this case to view an electronic bill after a user clicks on the bill on the mailbox screen. As noted above, bill/statement contents, and possibly other types of information, may require a secondary authentication.

Figure 8:
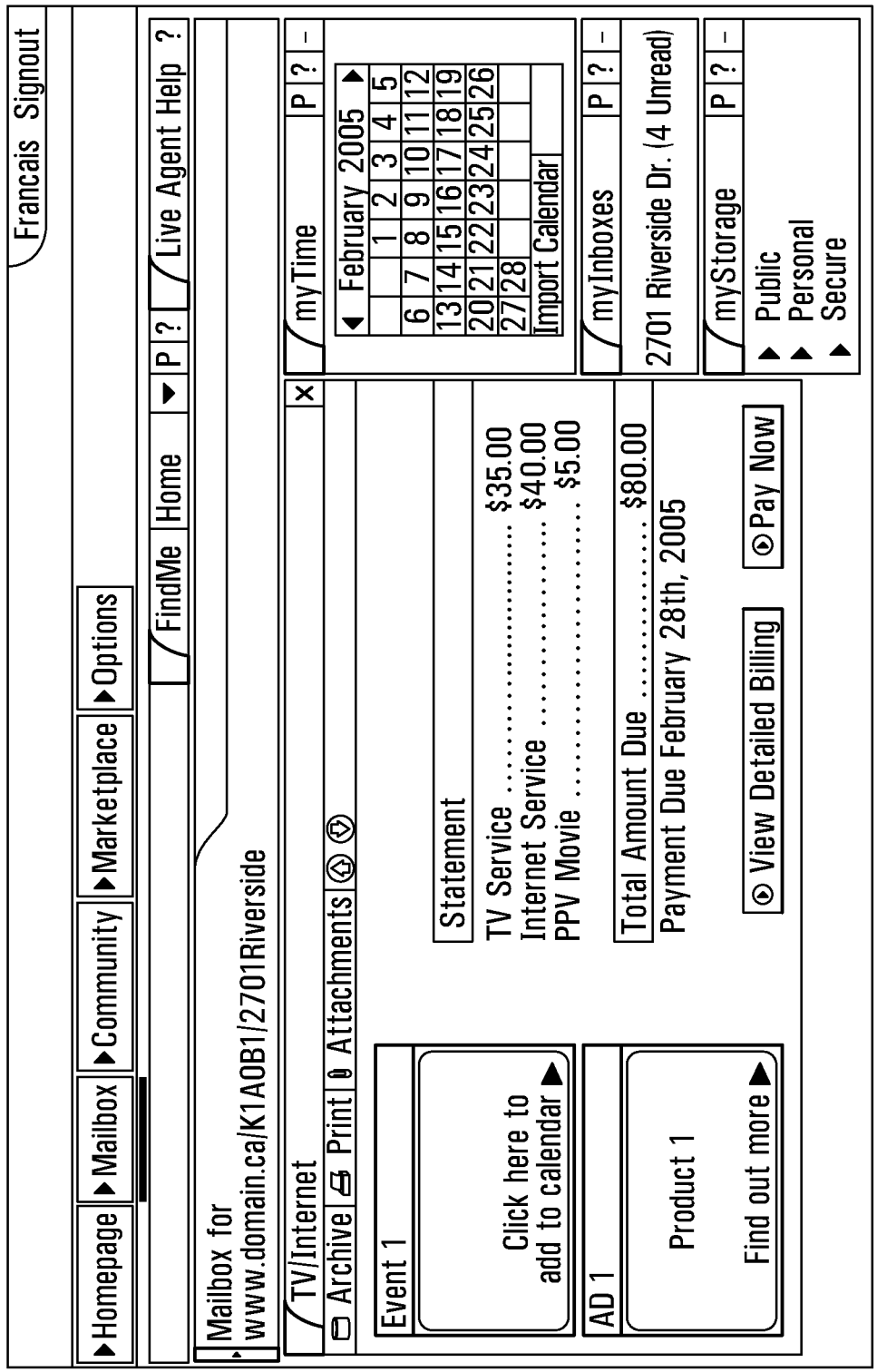

When the user has been authenticated for access to the bill being presented in FIG. 7, the content is displayed along with various options including the ability to pay the bill and to file or archive it, as shown in FIG. 8. When the content is opened for the first time, any due dates or important trigger dates may be automatically populated in the calendar, at the right side on the screen. A user might thereafter be notified of bill due dates or other important dates by a calendar notice pop-up alert.

Figure 9:
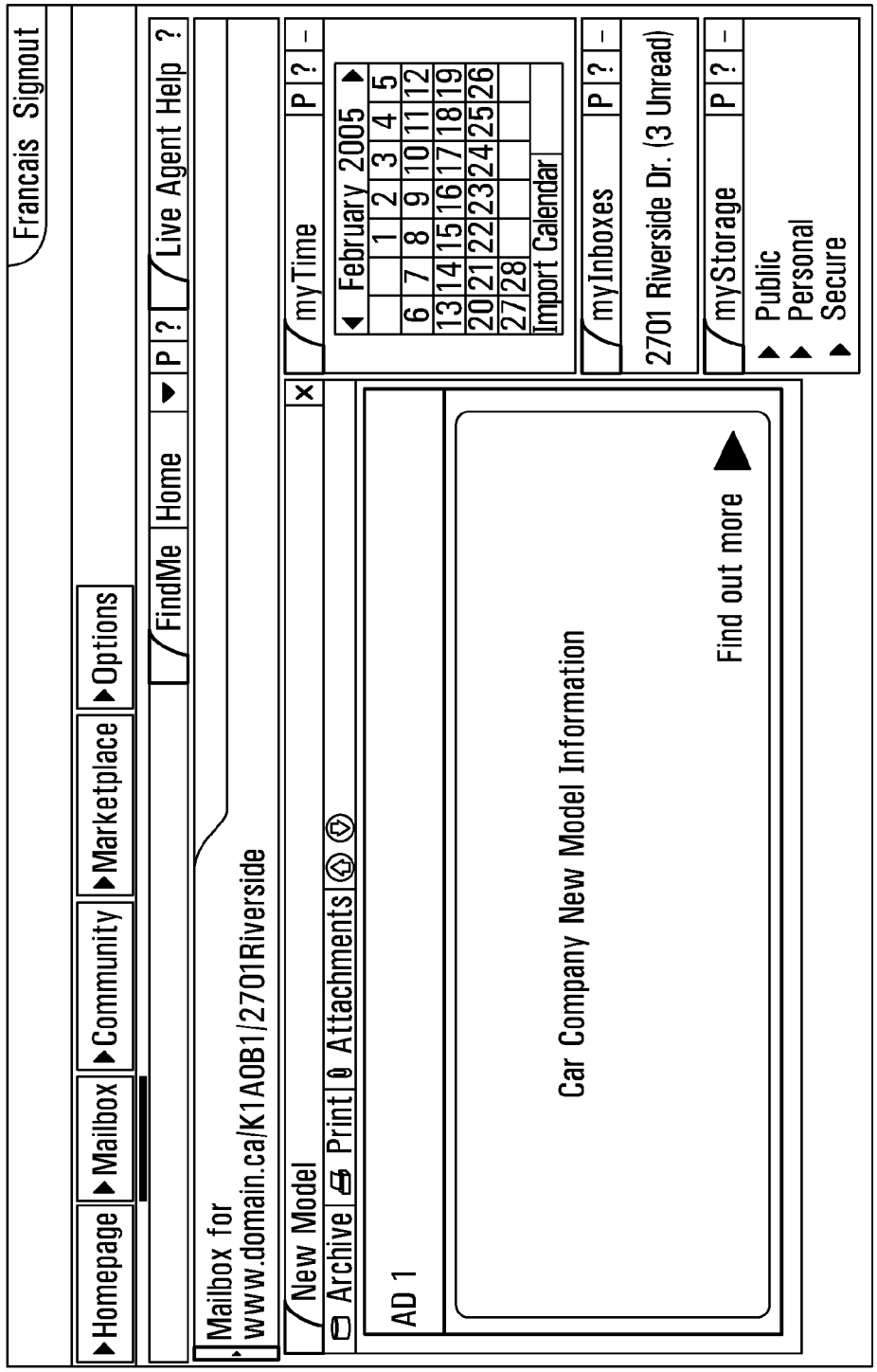

The screen of FIG. 9 may be displayed when the user opens an admailing from the main mailbox. The electronic admailing may be received by preference of the user and can include multi-media content. In addition, the admailings, like everything else, can be archived and stored for future viewing.

FIG. 10 shows a "community" section main page. Among other things, the screen in FIG. 10 includes a local business directory. It also provides access to local car pools, and shows community news and a calendar of events, as well as a listing of local community discussions and classifieds. Other information of local significance may also or instead be presented.

The geographic relevancy of the community section comes as a direct result of the geo-specific tie between an electronic address, a URL in the example shown in FIG. 10, and a geographic locator address. Populating such a screen with electronic content is one example of a function for which specific destination geographic locator addresses might not be provided with information to be distributed, but could be determined by an electronic content management system. When a user displays the community screen, content having local significance, such as listings of businesses within a certain proximity of the user's geographic locator address, is presented.

Figure 11:
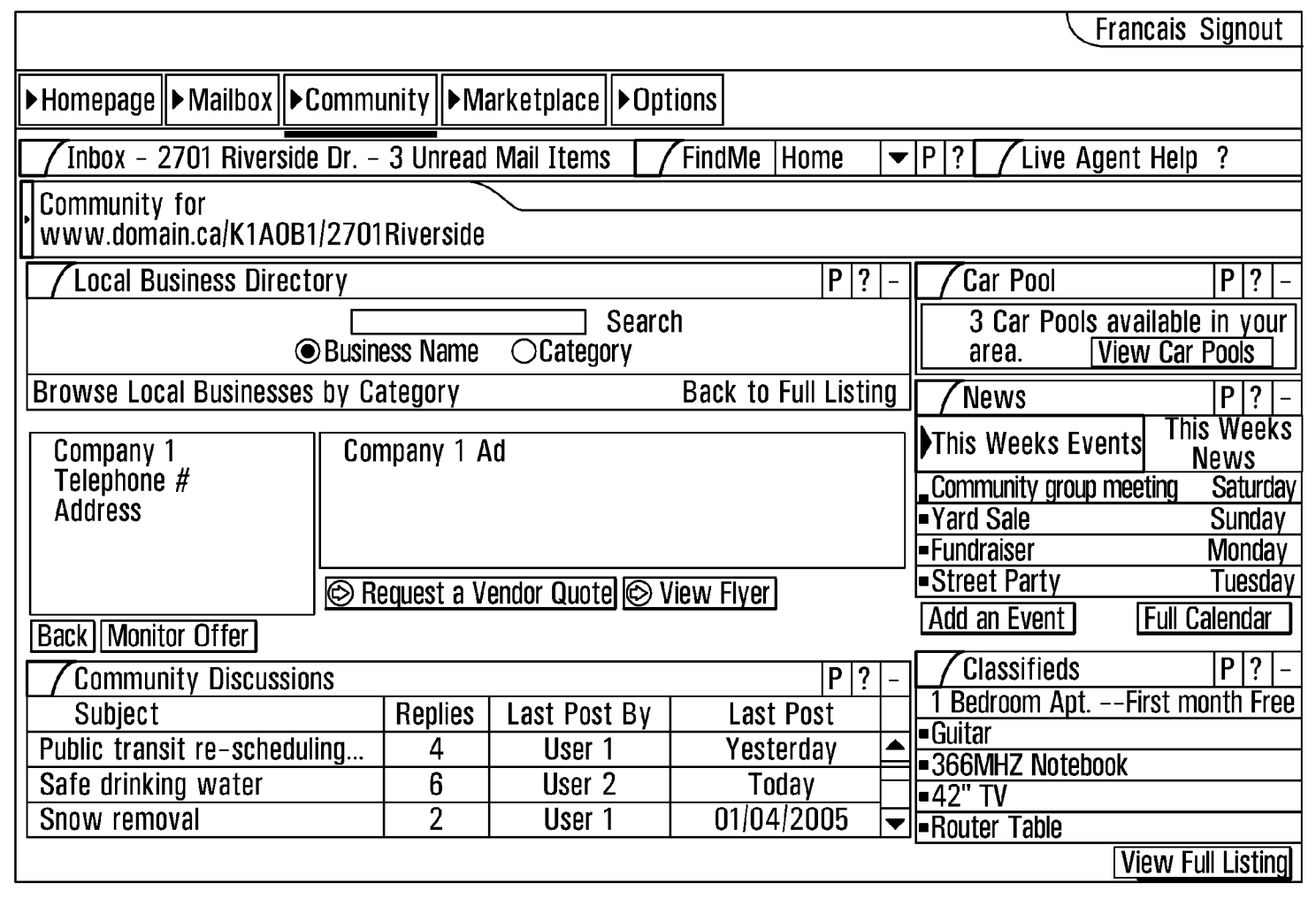

FIG. 11 shows a screen displaying a local business directory entry from the community section. Of particular note in this screen is the example of an opportunity for mediated interactive communications between the listed service provider and a user, shown in FIG. 11 as a "request a vendor quote" button. Another interactive option is provided by the "monitor offer" button, which may be selected by a user to monitor special offers made by the displayed service provider, company 1 in this example. The "view flyer" button provides access to other content associated with the service provider.

Figure 12:
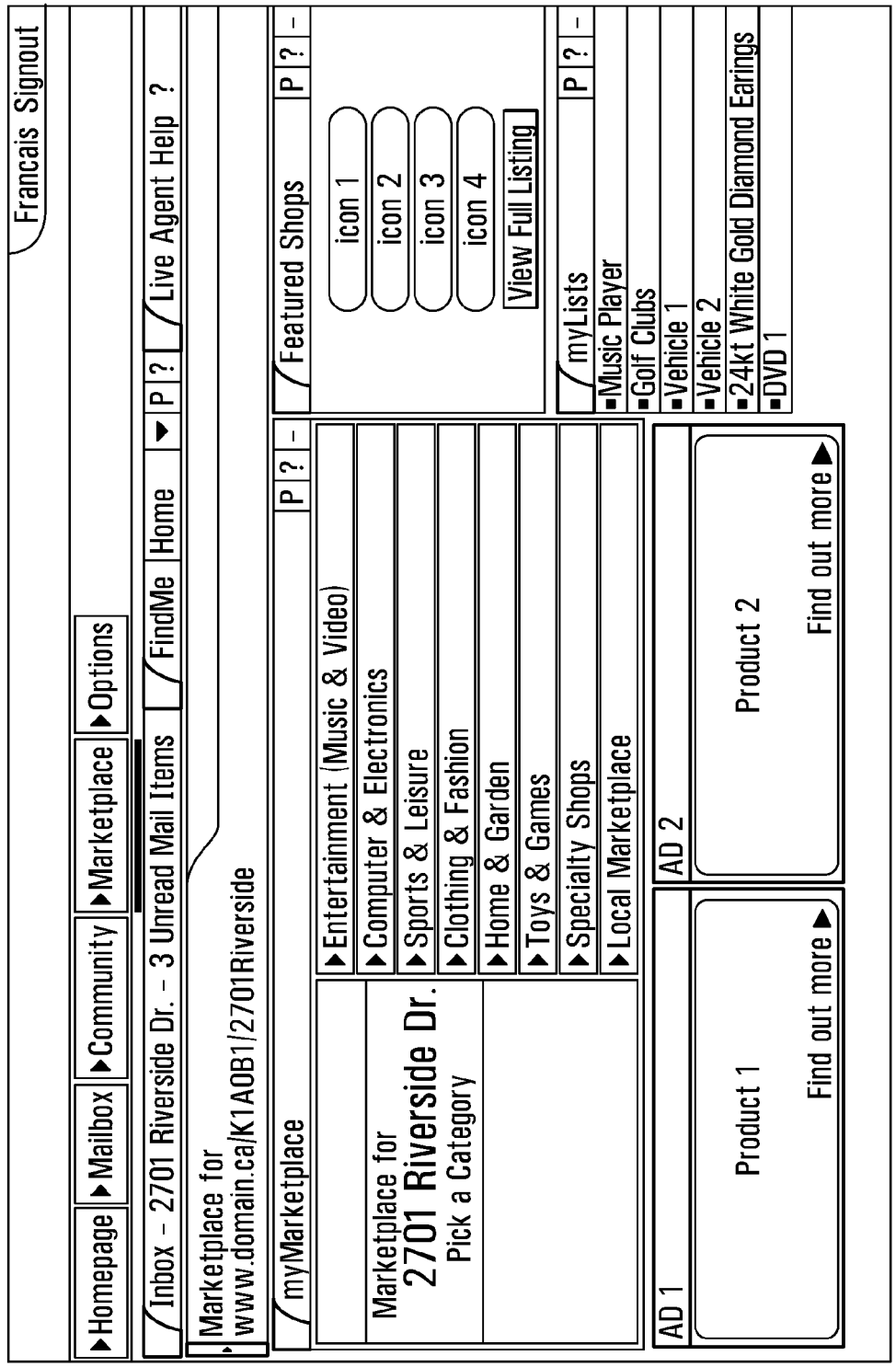

FIG. 12 shows a "marketplace" main screen, in which particular user-selected businesses, such as product vendors and/or service providers, are presented. Selected businesses can be organized into categories in the "myMarketplace" list, and particular entries, ads, or other information may be included in the "myLists" section. As shown, additional content such as ads and featured shops, which might not be specifically selected by a user, may also be presented on the marketplace screen.

FIG. 13 illustrates a screen displayed when the "Options" tab is selected. This options screen shows various user-control panel settings and usage records. It is the administration space for the electronic address, to the extent that the settings are under the control of the user and not an administrator of a content management system. FIG. 13 depicts account usage records and settings, along with an offering of upgraded service levels. Other administration options are also available as represented by the nested tabs across the top of the page. The marketing tab, for example, may provide access to a configuration screen in which user preferences can be established and/or modified.

Figure 14:
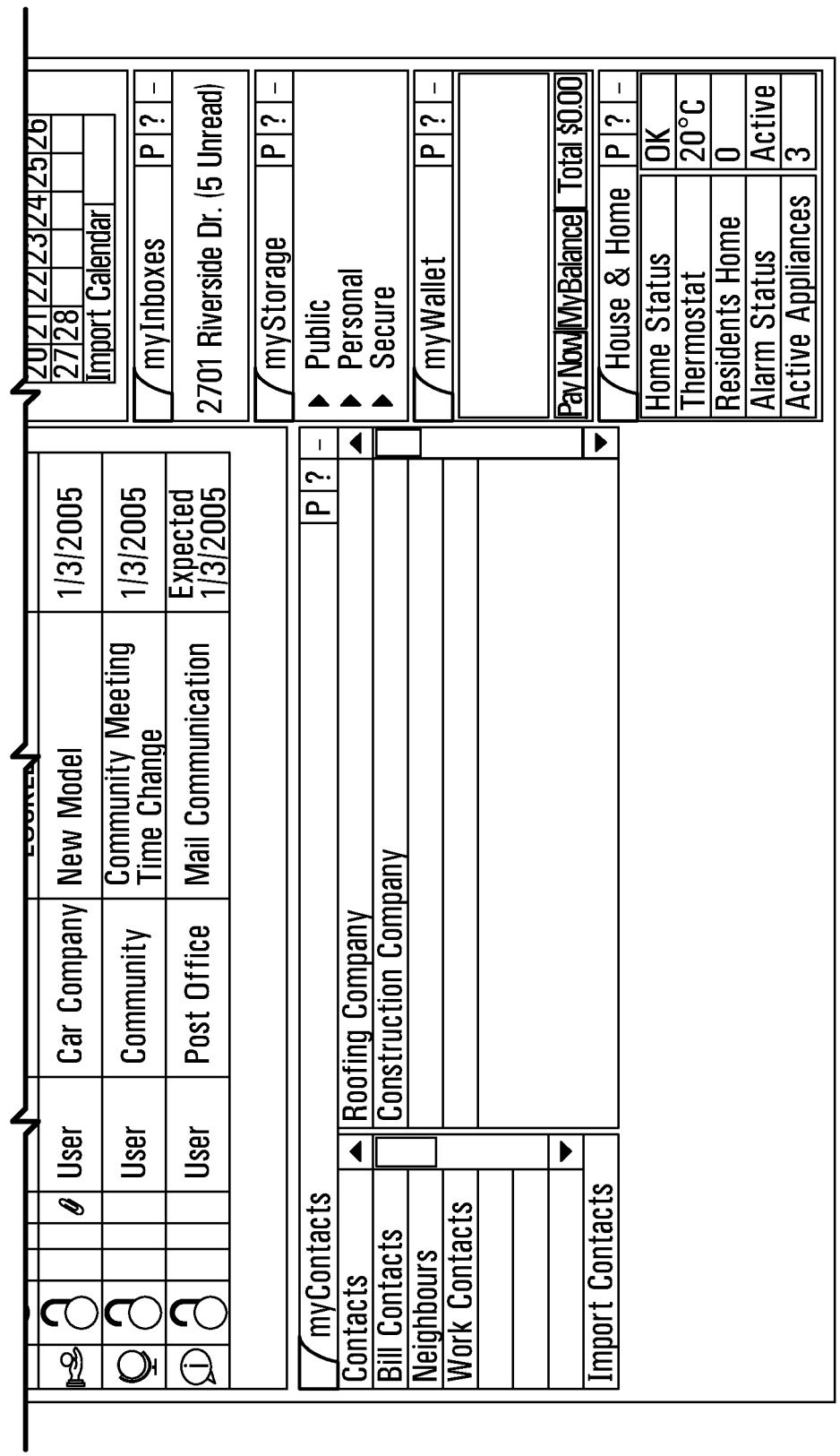

FIG. 14 illustrates some additional features which may be provided, such as at the bottom of the main mailbox screen of FIG. 6, for example. Various content and (possibly Web) service capabilities may be provided on this screen: storage and archive access; wallet functionality; a contacts listing which could be associated with any other contacts application (Web-based or otherwise); and even household appliance and infrastructure activity view and controls for an IP-based appliance and household system for instance.

Of these additional features, storage and archiving may be of particular interest. A user may securely store and access content, which may be content that was generated by the user or received from a content provider. Storage space may include local storage, remote storage on a server for instance, or both.

A user's store may also be configured for sharing with other users. In the example shown in FIG. 14, a user has a public folder for content which may be accessed by the user and other users. Public folders are exposed to any and all users who can access the storage location, over the Internet for instance, and is a place where shared items would be kept.

The illustrated user store also includes a personal folder. Personal folders may be private in the sense of being accessible only to those who can authenticate to the geo-specific electronic address, but shared among those authenticated users. Depending on how a user sets up the file structure, there may or may not be folders that include content to be shared within an initial-authentication user group, including a primary user and other users such as family members. Secondary authentication may be required for access to any or all content stored in personal folders.

A secure folder may be private in the same sense as a personal folder, protected from broad access (i.e., over the Internet) but available to all users that can access an electronic address. One possible use for secure folders may be to store content that is itself secured in some manner, by being certified or authenticated by a third-party as "original", or "untampered", etc., with an Electronic Post Mark, for example. The effect is that content in secure folders has evidentiary proof and support of originality or time/date. In this case, the distinction between personal and secure folders is essentially one of content. Both types of folders secure the access to content, and the content in secure folders is also itself secure for the purposes of tampering and non-repudiation for instance.

Figure 15:
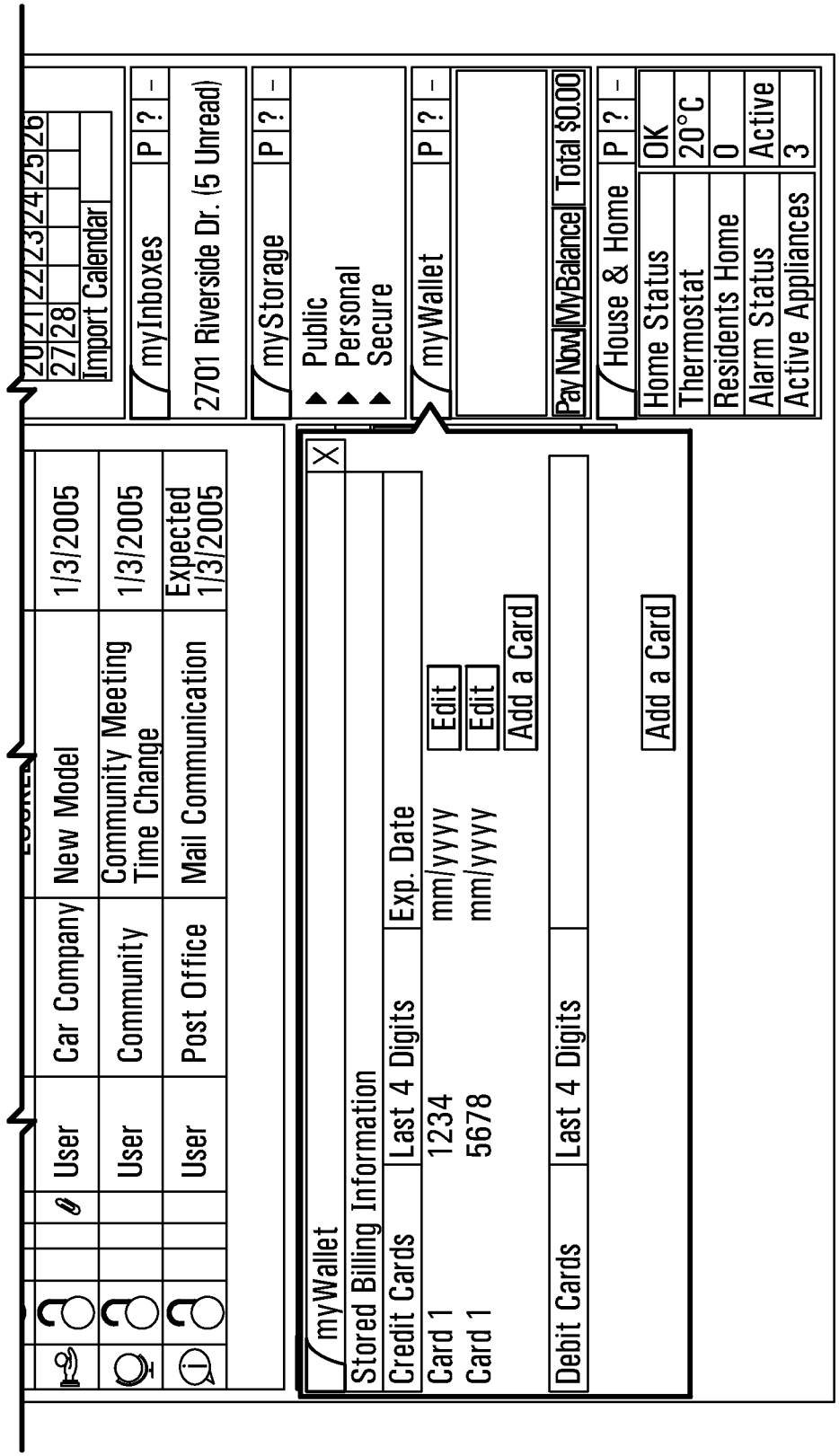

Another additional feature of potential interest is the wallet function. FIG. 15 shows a screen which is displayed when the user clicks on the walleting function of FIG. 14. It is a display indicating registered payment cards with access to an application that can add or edit wallet information and contents. The calendar and wallet functions may be integrated such that payment of a bill through the wallet function automatically removes the bill's due date from the calendar. Payment of a bill through the bill interface shown in FIG. 8 might similarly cause the bill due date to be removed from the calendar.

Figure 16:
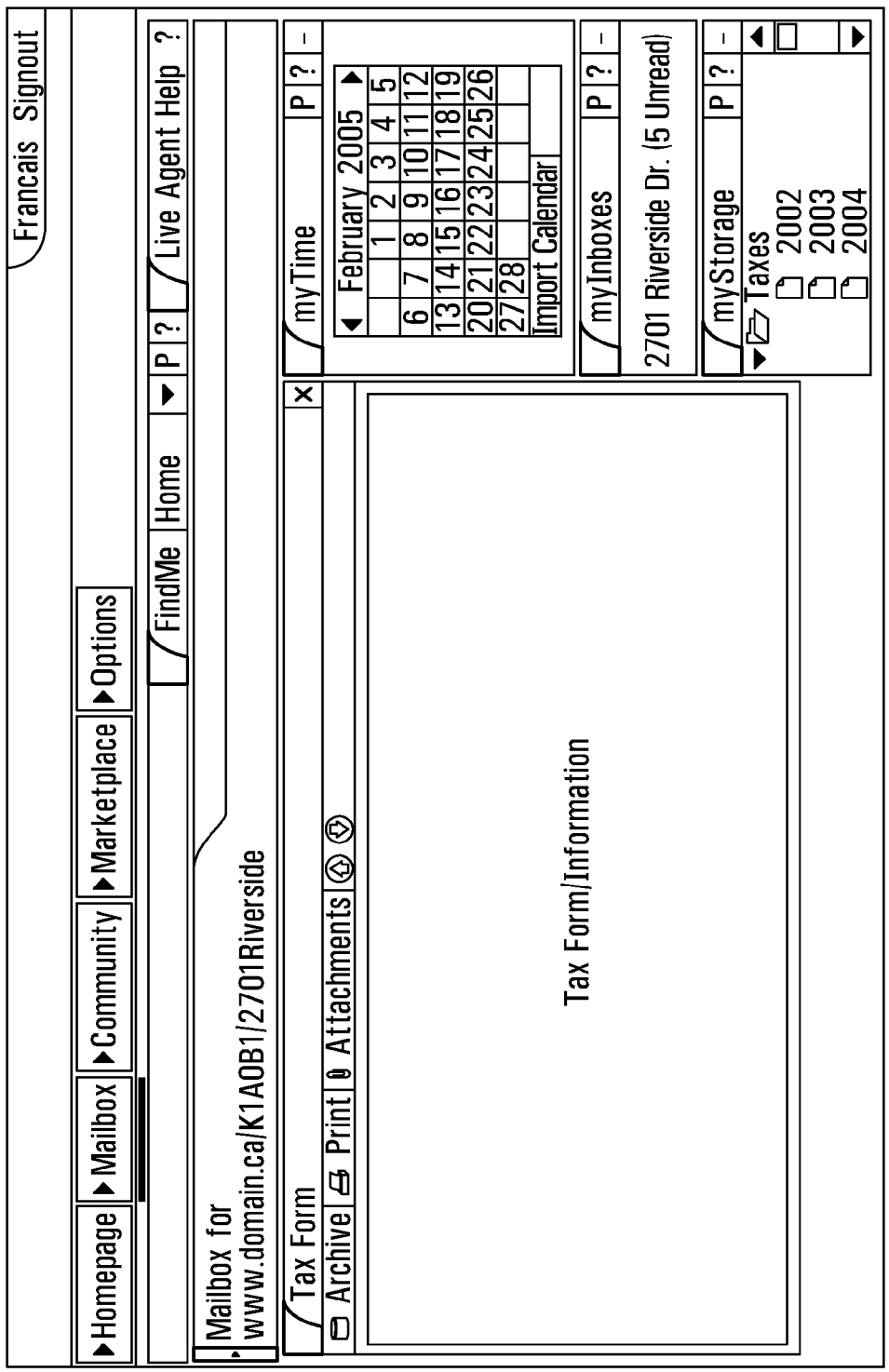

In FIG. 16, a representation of an archived tax form which is stored in a local secure archive is shown. It is equally possible that the archive could be mirrored on or defaulted to a provisioned space on archive service servers.

As will be apparent from FIGS. 5 to 16 and the foregoing description, a GUI presented in accordance with an embodiment of the invention may include an address graphical element displaying an indication of an electronic address which is used for accessing the GUI and is uniquely associated with a geographical locator address, and one or more content graphical elements displaying electronic content including information that was destined for the geographical locator address and distributed to the electronic address. The content graphical element(s) may include "active" elements that can be selected to access additional content, such as individual mail items, business directory entries, etc.

Embodiments of the invention provide geo-specific addressing, i.e., a persistent, unique mapping of a physical address to a corresponding electronic equivalent based solely on physical location. A "sealed" electronic envelope which is delivered to an electronic address may be opened only by a suitably authenticated person in some instances.

However, virtually any "addressee" attribute may also be associated in some way with any and all addresses. These attributes could refer both to the address attributes associated with a geographic locator address (e.g., apartment number, RR#, direction, street/avenue/etc., and so on) as well as to attributes associated with authenticated and authorized users. Once in-person proofed and in possession/ownership of an electronic address, the user can choose to add attributes to the profile (e.g. credit card numbers, personal information, associate bank accounts, preferences, and other associations).

What has been described is merely illustrative of the application of principles of embodiments of the invention. Other arrangements and methods can be implemented by those skilled in the art without departing from the scope of the present invention.

For example, the functions disclosed herein may be distributed differently than explicitly described above and shown in the drawings. An electronic content management system, for example, might include an electronic content distribution module and access an address store which was populated by a remote address converter.

In addition, although described primarily in the context of methods and systems, other implementations of the invention are also contemplated, as instructions and/or data structures stored on a machine-readable medium for example.

FIG. 17 is a block diagram of one such data structure. Other embodiments may include fewer, further, and/or different data fields arranged in a similar or different order than shown.

The example data structure 50 includes a geographic locator address 52, an electronic address 54 generated on the basis of the geographic locator address, an indication 56 of one or more user preferences, and possibly other information 58 relating to the addresses 52, 54. Data may be stored in the address store 27 and/or the preferences store 29 (FIG. 2), for example, in the format shown in FIG. 17. Various options for specifying the addresses 52, 54, the preference(s) 56, and the information 58 may be or become apparent to those skilled in the art.

A unique association between the geographic locator address 52 and the electronic address 54 is inherent in the data structure 50 in that both addresses are stored in one entry. However, it should be appreciated that a data structure may instead include an explicit indication of such an association, in the form of a flag or pointer for instance. The association between the addresses 52, 54 enable the electronic address 54 to be identified for distribution of electronic content that includes information destined for the geographic locator address 52. Distribution of electronic content to the electronic address 54 may be controlled in accordance with the preference(s) 56.

We claim:

1. A system for managing electronic content, the system comprising:
    an interface to receive information that is to be distributed to a geographic locator address;
    an address converter to convert geographic locator addresses into respective unique electronic addresses uniquely associated with and comprising one or more elements of the geographic locator addresses, to store the unique electronic addresses in an address store, to determine after the information is received whether the geographic locator address to which the received information is to be distributed has an associated unique electronic address in the address store, and to generate the unique associated electronic address after the information is received by converting the geographic locator address into the unique associated electronic address where the geographic locator address does not have the associated unique electronic address in the address store; and an electronic content distribution module operatively coupled to the interface, to determine the unique electronic address that is uniquely associated with the geographic locator address by accessing the address store, and to make electronic content, which comprises the received information, available through the determined unique electronic address.

2. The system of claim 1, wherein the address converter is operable to convert the geographic locator addresses into the respective unique associated electronic addresses by applying an address schema to the geographic locator addresses, the address schema specifying the one or more elements of the geographic locator addresses.

3. The system of claim 1, wherein the unique electronic address comprises a unique Uniform Resource Locator (URL), and wherein the electronic content distribution module makes the electronic content available through the unique electronic address by posting the electronic content to the unique URL.

4. The system of claim 1, further comprising:
a secure host system for hosting the unique electronic address, the secure host system controlling access to the electronic content through the unique electronic address in accordance with a security policy that requires at least one stage of user authentication.

5. The system of claim 1, wherein the electronic content distribution module is further operable to determine whether the received information satisfies a preference configured for the geographic locator address, and to make the electronic content available only if the received information satisfies the preference.

6. The system of claim 1, wherein the received information comprises electronic content that is to be distributed to the geographic locator address or from the geographic locator address; and the electronic content distribution module is further operable: to process the received information; to provide an indication of the processing; and to distribute the processed electronic content and the indication of the processing to the unique electronic address uniquely associated with the geographic locator address where the received electronic content is to be distributed to the geographic locator address, or from the geographic locator address where the received electronic content is to be distributed from the geographic locator address.

7. The system of claim 6, wherein the received electronic content is associated with a transaction originating from the geographic locator address.

8. The system of claim 6, wherein the received electronic content is associated with a response transaction in response to a transaction originating from a source other than the geographic locator address.

9. The system of claim 6, wherein the indication comprises an electronic post mark.

10. The system of claim 6, wherein the electronic post mark is generated using a hash or other transformation of the received electronic content.

11. The system of claim 9, wherein the electronic content distribution module generates the electronic post mark.

12. The system of claim 6, wherein the electronic content distribution module is operable to process the electronic content according to a content schema.

13. The system of claim 6, wherein the electronic content distribution module is further operable to determine a type of the received electronic content, and to process the received electronic content according to the determined type.

14. A method of managing electronic content, the method comprising:
converting geographic locator addresses into respective unique electronic addresses uniquely associated with and comprising one or more elements of the geographic locator addresses;
populating an address store using the geographic locator addresses and the unique associated electronic addresses;
receiving information that is to be distributed to a geographic locator address;
determining after the information is received whether the geographic locator address to which the received information is to be distributed has an associated unique electronic address in the address store;
generating the unique associated electronic address after the information is received by converting the geographic locator address into the unique associated electronic address where the geographic locator address does not have the associated unique electronic address in the address store;
accessing the address store to determine the unique electronic address that is uniquely associated with the geographic locator address; and
making electronic content, which comprises the received information, available through the unique electronic address.

15. The method of claim 14, wherein the unique electronic address comprises a unique Uniform Resource Locator (URL), and wherein making the electronic content available comprises posting the electronic content to the unique URL.

16. The method of claim 14, wherein making the electronic content available comprises determining whether the received information satisfies a preference configured for the geographic locator address, and making the electronic content available only if the received information satisfies the preference.

17. A non-transitory computer-readable medium storing instructions which when executed perform the method of claim 14.

18. The method of claim 14, wherein converting the geographic locator addresses into the respective unique associated electronic addresses comprises applying an address schema to the geographic locator addresses, the address schema specifying the one or more elements of the geographic locator addresses.

19. The method of claim 14, further comprising:
controlling access to the electronic content through the unique electronic address in accordance with a security policy that requires at least one stage of user authentication.

20. The method of claim 14, wherein the received information comprises electronic content that is to be distributed to the geographic locator address or from the geographic locator address, the method further comprising:
processing the received information;
providing an indication of the processing; and distributing the processed electronic content and the indication of the processing to the unique electronic address uniquely associated with the geographic locator address where the received electronic content is to be distributed to the geographic locator address, or from the geographic locator address where the received electronic content is to be distributed from the geographic locator address.

21. The method of claim 20, wherein the received electronic content is associated with a transaction originating from the geographic locator address.

22. The method of claim 20, wherein the received electronic content is associated with a response transaction in response to a transaction originating from a source other than the geographic locator address.

23. The method of claim 20, wherein the indication comprises an electronic post mark.

24. The method of claim 20, wherein the electronic post mark is generated using a hash or other transformation of the received electronic content.

25. The method of claim 23, further comprising:
generating the electronic post mark.

26. The method of claim 20, wherein the processing comprises processing the electronic content according to a content schema.

27. The method of claim 20, further comprising:
determining a type of the received electronic content,
wherein the processing comprises processing the received electronic content according to the determined type.

28. A system for managing electronic content, the system comprising:
an interface to receive information for distribution to geographic locator addresses, the information comprising addressed information that specifies a unique geographic locator address to which the addressed information is to be distributed, and unaddressed information that specifies no unique geographic locator addresses to which the unaddressed information is to be distributed; and
an electronic content distribution module operatively coupled to the interface, to distribute electronic content comprising the received addressed information to a unique electronic address that is uniquely associated with the geographic locator address specified by the addressed information; to determine, based on a geographic locator address of a source of the received unaddressed information, geographic locator addresses in a geographic area in which the received unaddressed information has local significance; and to distribute electronic content comprising the received unaddressed information to respective unique electronic addresses uniquely associated with the determined geographic locator addresses in the geographic area in which the received unaddressed information has local significance.

29. The system of claim 28, wherein the received addressed information specifies a plurality of unique geographic locator addresses, including the unique geographic locator address, to which the received addressed information is to be distributed, and wherein the electronic content distribution module is further operable to distribute the electronic content comprising the addressed information to respective unique electronic addresses uniquely associated with the plurality of unique geographic locator addresses.

30. The system of claim 28, wherein the interface is further operable to receive a request for the unaddressed information from an electronic address, and wherein the electronic content distribution module is operable to distribute the electronic content comprising the unaddressed information to the electronic address responsive to the received request.

31. The system of claim 28, wherein the electronic content comprising the unaddressed information enables a user accessing the electronic content to perform further actions comprising one or more of: moving into an electronic shopping environment, requesting a call-back from a source of the unaddressed information, and requesting a quotation service from the source of the unaddressed information.

32. A system for managing electronic content, the system comprising:
an interface to receive information for distribution to a geographic locator address, the information comprising information addressed to the geographic locator address and specifically-addressed information addressed to a specific user associated with the geographic locator address;
an electronic content distribution module operatively coupled to the interface, to distribute electronic content comprising the received information to a unique electronic address that is uniquely associated with the geographic locator address; and
a secure host system for hosting the unique electronic address, the secure host system controlling access to the electronic content through the unique electronic address in accordance with an authentication process, the authentication process comprising a first user authentication for access to the unique electronic address and the electronic content comprising the information addressed to the geographic locator address, and a second user authentication different from the first user authentication for access to the electronic content comprising the specifically-addressed information.

33. The system of claim 32, wherein the first user authentication further provides access to basic tombstone address data associated with the electronic content comprising the specifically-addressed information.

34. The system of claim 32, the authentication process providing a triangular connection between the specific user, the geographic locator address, and the electronic content comprising the specifically-addressed information, the triangular connection comprising: a connection between the specific user and the electronic content by virtue of the specifically-addressed information; a connection between the specific user and the geographic locator address; and a connection between the geographic locator address and the electronic content by virtue of the specifically-addressed information.

35. A method of managing electronic content, the method comprising:
receiving information for distribution to geographic locator addresses, the information comprising addressed information that specifies a unique geographic locator address to which the addressed information is to be distributed, and unaddressed information that specifies no unique geographic locator addresses to which the unaddressed information is to be distributed;
distributing electronic content comprising the received addressed information to a unique electronic address that is uniquely associated with the geographic locator address specified by the addressed information;
determining, based on a geographic locator address of a source of the received unaddressed information, geographic locator addresses in a geographic area in which the received unaddressed information has local significance; and distributing electronic content comprising the received unaddressed information to respective unique electronic addresses uniquely associated with the determined geographic locator addresses in the geographic area in which the received unaddressed information has local significance.

36. The method of claim 35, wherein the received addressed information specifies a plurality of unique geographic locator addresses, including the unique geographic locator address, to which the received addressed information is to be distributed, and wherein the method further comprises:
distributing the electronic content comprising the addressed information to respective unique electronic addresses uniquely associated with the plurality of unique geographic locator addresses.

37. The method of claim 35, further comprising:
receiving a request for the unaddressed information from an electronic address; and
distributing the electronic content comprising the unaddressed information to the electronic address responsive to the received request.

38. The method of claim 35, wherein the electronic content comprising the unaddressed information enables a user accessing the electronic content to perform further actions comprising one or more of: moving into an electronic shopping environment, requesting a call-back from a source of the unaddressed information, and requesting a quotation service from the source of the unaddressed information.

39. A method of managing electronic content, the method comprising:
receiving information for distribution to a geographic locator address, the information comprising information addressed to the geographic locator address and specifically-addressed information addressed to a specific user associated with the geographic locator address;
distributing electronic content comprising the received information to a unique electronic address that is uniquely associated with the geographic locator address; and
controlling access to the electronic content through the unique electronic address in accordance with an authentication process, the authentication process comprising a first user authentication for access to the unique electronic address and the electronic content comprising the information addressed to the geographic locator address, and a second user authentication different from the first user authentication for access to the electronic content comprising the specifically-addressed information.

40. The method of claim 39, wherein the first user authentication further provides access to basic tombstone address data associated with the electronic content comprising the specifically-addressed information.

41. The method of claim 39, the authentication process providing a triangular connection between the specific user, the geographic locator address, and the electronic content comprising the specifically-addressed information, the triangular connection comprising: a connection between the specific user and the electronic content by virtue of the specifically-addressed information; a connection between the specific user and the geographic locator address; and a connection between the geographic locator address and the electronic content by virtue of the specifically-addressed information.

* * * * *